United States Patent [19]

Masumoto

[11] Patent Number: 4,673,258
[45] Date of Patent: Jun. 16, 1987

[54] ULTRA COMPACT ZOOM LENS SYSTEM
[75] Inventor: Hisayuki Masumoto, Sakai, Japan
[73] Assignee: Minolta Camera Kabushiki Kaisha, Osaka, Japan
[21] Appl. No.: 647,711
[22] Filed: Sep. 5, 1984
[30] Foreign Application Priority Data Sep. 6, 1983 [JP] Japan ................................. 58-164768
Dec. 28, 1983 [JP] Japan ................................. 58-251085
Aug. 28, 1984 [JP] Japan ................................. 59-178694

[51] Int. Cl.$^4$ .......................... G02B 7/04; G02B 15/15
[52] U.S. Cl. ................................. 350/427; 350/423
[58] Field of Search ............................... 350/427, 423
[56] References Cited

U.S. PATENT DOCUMENTS 4,494,828 1/1985 Masumoto et al. ................ 350/423

FOREIGN PATENT DOCUMENTS 0168209 10/1982 Japan ................................. 350/423

Primary Examiner—John K. Corbin
Assistant Examiner—Rebecca D. Gass
Attorney, Agent, or Firm—Price, Gess & Ubell

[57] ABSTRACT

The present invention is to provide an ultra compact zoom lens system which comprises from an object side to an image side, a first lens group of a positive refracting power, a second lens group of a negative refracting power with a first variable air space formed between the first and second lens groups, a third lens group of a positive refracting power, an fourth lens group of a negative refracting power with a second variable air space formed between the third and fourth lens groups, wherein the first lens group is shiftable from the image side to the object side with an increasing of the first variable air space in the zooming operation from the shortest focal length to the longest focal length, and wherein the fourth lens group is shiftable from the image side to the object side with a decreasing of the second variable air space in the zooming operation from the shortest focal length to the longest focal length.

13 Claims, 83 Drawing Figures

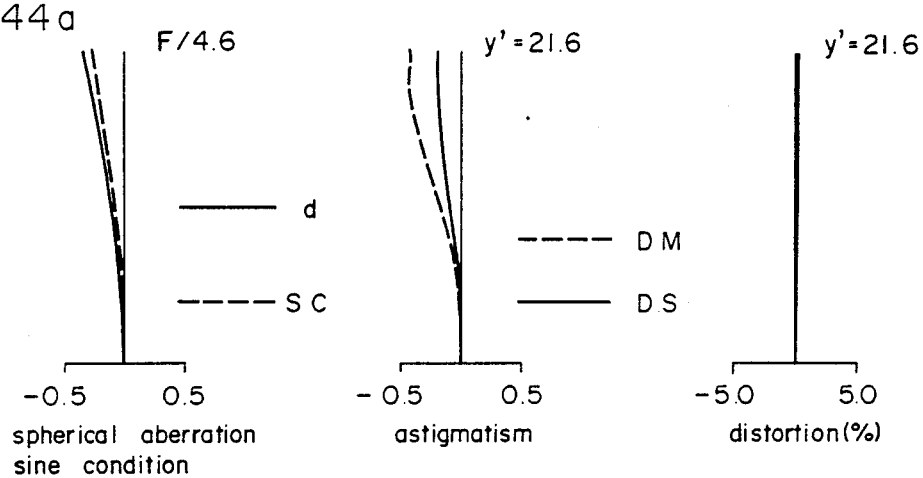
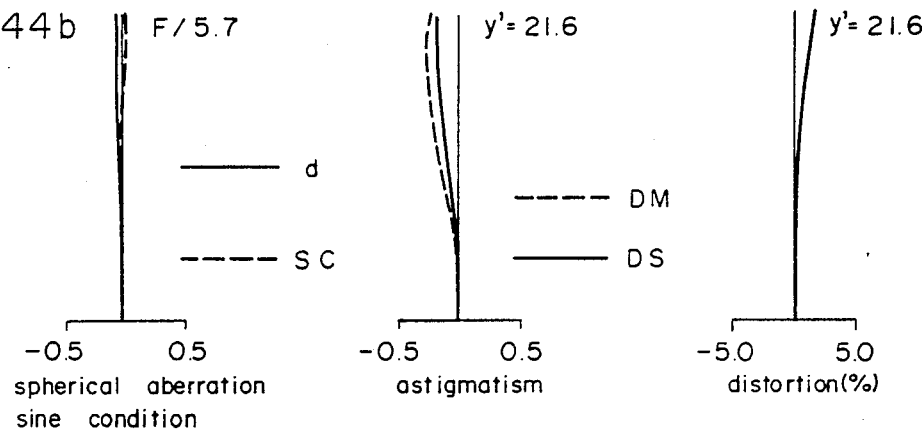
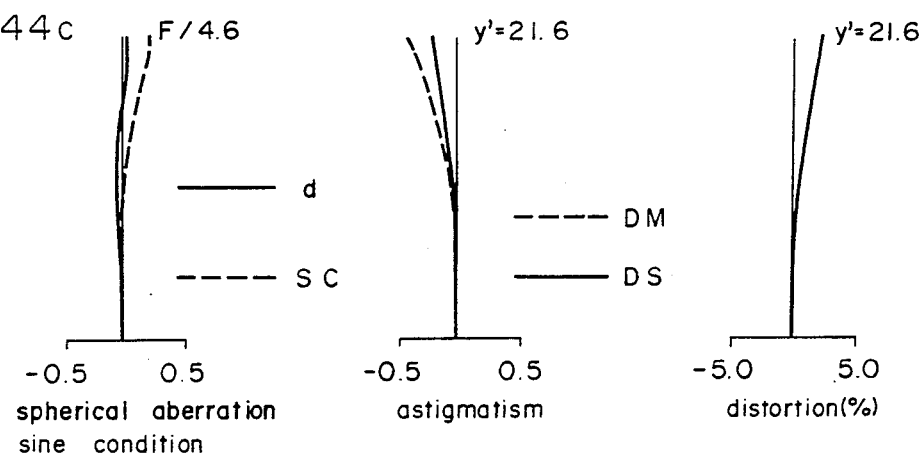

ULTRA COMPACT ZOOM LENS SYSTEM

BACKGROUND OF THE INVENTION

1. Field of the Invention

The present invention relates to a compact zoom lens system, and more particularly to a compact zoom lens system with a shortest focal length of about 50 mm to 135 mm and with a zoom ratio of about 2 to 3.

2. Description of the Prior Art

As a mechanical compensation type zoom lens system which has a same shortest focal length and a same zoom ratio as that of the present invention, the following three types have been proposed conventionally:
- (A) 4-unit type telephoto zoom lens system,
- (B) 2-unit type standard zoom lens system,
- (C) 3-(or 4-) unit type standard zoom lens system with a large zoom ratio in which the first lens unit located at the most object side is shiftable in a zooming operation.

The 4-unit type telephoto zoom lens system in category (A) includes, from the object side, a focusing lens unit (I) of a positive refractive power, a variator lens unit (II) of a negative refractive power, a compensator lens unit (III) of a positive or a negative refractive power, and a master lens unit (IV) of a positive refractive power, as shown in FIG. 1. The variator lens unit (II) is shifted for a zooming operation, and the compensator lens unit (III) is simultaneously shifted for compensating the change in the image plane due to the shifting of the variator lens unit (II).

In this type of lens system, the following defects are presented;

1. The refractive power of the variator lens unit (II) is relatively strong, since the zooming operation is achieved only by shifting of the variator lens unit (II). Thus, it is difficult to make the variator lens unit simple in construction. On the contrary, if the refractive power of the variator lens unit (II) becomes weak, the total length of the whole lens system, i.e., the distance from the object side surface of a lens element located at the most object side to the image plane, must be extended since the shifting distance of the variator lens unit (II) in a zooming operation becomes large.

2. An inverted telephoto type lens system is formed in the shortest focal length condition of the zoom lens system as shown in FIG. 1 since the negative refractive power of the variator lens unit (II) is relatively strong. This means that the total length of the whole lens system becomes long in comparison with the focal length thereof.

3. It is difficult to make each of the lens units simple in construction, since each lens units, especially the variator lens unit (II) and the master lens unit (IV), have relatively strong power.

Meanwhile, the 2-unit type standard zoom lens system described in the above category (B), as shown in FIG. 2, includes, from the object side, the first lens unit (I) of a negative refractive power and the second lens unit (II) of a positive refractive power. The first lens unit (I) and the second lens unit (II) are simultaneously shifted along the optical axis to achieve a zooming operation and to compensate the change in the position of the image plane. In this type of a zoom lens system, the following drawbacks are presented;

1. As understood from FIG. 2, a strong inverted telephoto type is formed at the shortest focal length (S) and also an inverted telephoto type is formed through the whole zooming range. Accordingly, if the focal length range is set in the telephoto region, the total length of the whole lens system becomes long.

2. If the refractive power of each unit is increased for more compactness of the lens system, the number of the lens elements of each unit will be also increased. Accordingly, it is impossible to make the construction simple. Conversely, if the refractive power is decreased, the shifting distance of each group for the zooming operation and for the focusing operation will unfavorably become large.

The 3-unit standard zoom lens system in the above category (C), as shown in FIG. 3, includes, from the object side, a first lens unit (I) of a positive refractive power, a second lens unit (II) of a negative refractive power and a third lens unit (III) of a positive refractive power. The first lens unit (I) and the third lens unit (III) are simultaneously shifted along an optical axis in the zooming operation to share the zooming effect into both lens units so that a high magnification ratio can be obtained. However, if this type lens system is applied to a telephoto zooming lens system, the following defects are presented;

1. Although the total length of the lens system can be shorter than that of the 4-unit zoom lens system in category (A), the lens system forms an inverted telephoto type at the shortest focal length (S). Accordingly, the desired compactness can not be achieved.

2. Since the lateral magnification of the second lens unit (II) and that of the third lens unit (III) are negative, it becomes difficult to decrease the number of lens elements of each group without weakening the refractive power of each of the second and third lens units (II) (III). On the contrary, the desirable compactness can not be obtained if weakening the refractive power of each of the second and third lens units (II) (III) is not permitted.

SUMMARY OF THE INVENTION

An object of the present invention is to provide a new type of zoom lens system with a more compact size than that of the conventional type lens systems in the above mentioned categories (A) to (C).

Another object of the present invention is to provide the above new type of zoom lens system wherein the number of the lens elements of each unit is decreased by means of weakening the refractive power of each lens unit and setting the lateral magnification of each unit far from $-1$.

Still another object of the present invention is to provide a zoom lens system with a relatively small shifting distance of the lens unit serving for the zooming in spite of the relatively small refractive power of each lens unit.

Further object of the present invention is to provide a zoom lens system with a shorter total length than that of the conventional lens systems.

The features of the present invention which are believed to be novel are set forth with particularity in the appended claims. The present invention, both as to its organization and manner of operation, together with further objects and advantages thereof, may best be understood by reference to the following description, taken in conjunction with the accompanying drawings.

BRIEF DESCRIPTION OF THE DRAWINGS

FIG. 44a, b, and c represent graphs showing various aberrations of the embodiment 10 at the shortest, medium, and longest focal length, respectively;

DETAILED DESCRIPTION OF THE PREFERRED EMBODIMENTS

Figure 1:
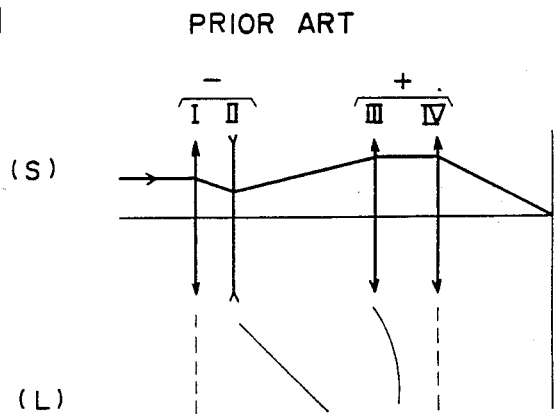
FIG. 1 represents a schematic view of the conventional 4-unit type zoom lens system with the movement of each of the lens units between the shortest and longest focal lengths.
Figure 2:
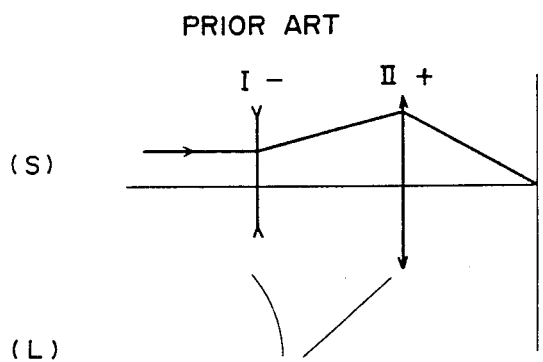
FIG. 2 represents a schematic view for showing the movement of each of the lens units same as in FIG. 1 in a conventional 2-units type zoom lens system.
Figure 3:
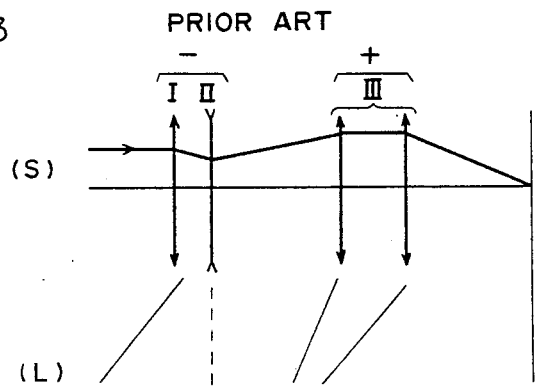
FIG. 3 represents a schematic view for showing the movement of each of the lens units same as in FIG. 1 in a conventional 3-units type zoom lens system.

The following description is provided to enable any person skilled in the optical and camera field to make and use the invention and sets forth the best modes contemplated by the inventor for carrying out his invention. Various modifications, however, will remain readily apparent to those skilled in the art, since the generic principles of the present invention have been defined herein specifically to provide a relatively economical and easily manufactured compact zoom lens system. The derivation of the formulas and the relation of the powers set forth herein can be accomplished with the assistance of a computer. The present invention represents the parameters of a compromise balance of acceptable aberrations which can be relatively easily manufactured to provide a low cost lens system for utilization with a 35 mm SLR camera.

In the drawings, schematic cross sectional views disclose the position of the lens units and lens elements for the shortest focal length with arrows below the lens units representing the directions of their movements for zooming toward the longest focal length. Due to the number of lens elements involved, it was not deemed appropriate to include individual designation of the radii of curvature and axial distances for each lens element and air space. These values, however, are provided in the accompanying tables set forth herein, and the schematic cross sectional views of the respective embodiments follow the normal conventions of an object at the left-hand side of the drawing and the image plane at the right-hand side.

Figure 4:
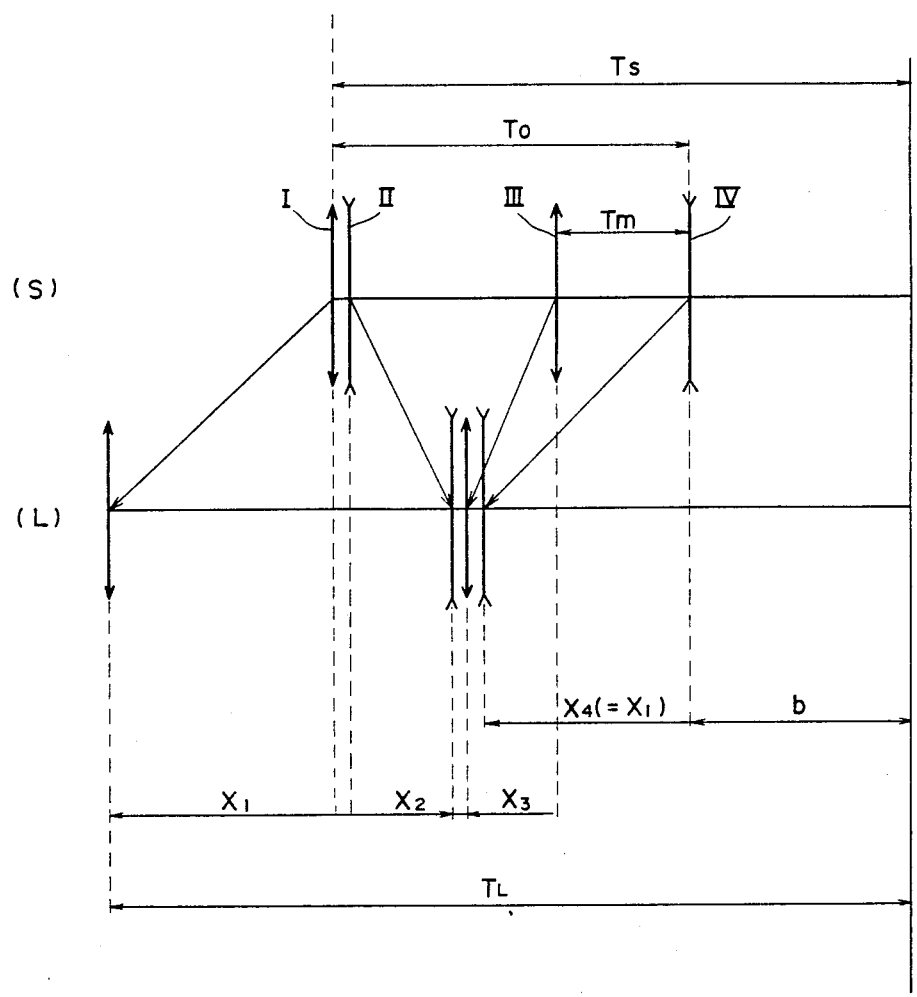
FIG. 4 represents a schematic view for showing the movement of each of the lens units same as in FIG. 1 in the lens system according to the present invention.

The present invention is to provide an ultra compact zoom lens system which comprises, as shown in FIG. 4, from an object side to an image side, a first lens unit (I) of a positive refracting power, a second lens unit (II) of a negative refracting power with a first variable air space formed between the first and second lens units (I) (II), a third lens unit (III) of a positive refracting power, and a fourth lens unit (IV) of a negative refracting power with a second variable air space formed between the third and fourth lens units, wherein the first lens unit (I) is shiftable from the image side to the object side with an increasing of the first variable air space in the zooming operation from the shortest focal length (S) to the longest focal length (L), and wherein the fourth lens unit (IV) is shiftable from the image side to the object side with a decreasing of the second variable air space in the zooming operation from the shortest focal length (S) to the longest focal length (L).

FIG. 4 shows an example of the movement of each of the lens units according to the present invention. In the example of FIG. 4, the first lens unit (I) and the fourth lens unit (IV) are shiftable integrally with each other in the zooming operation, while the second lens unit (II) is shiftable independently of the first and fourth lens units (I) and (IV) in the zooming operation. The third lens unit (III) is not shifted in the zooming operation in FIG. 4. The present invention, however, is not limited to such a movement. For example, the first and fourth lens units (I) (IV) may be shifted independently of each other, although the construction of the lens barrel can be made simple by means of shifting these lens units integrally with each other. Further, the lens barrel can be made simple in construction by means of fixing at least one of the second and third lens units (II) (III) in the zooming operation.

An ultra compact zoom lens system according to the present invention has the following effects;

(1) Since the zoom lens system of the present invention forms a telephoto type at the shortest focal length, in which, a front lens unit of a positive refractive power is located at the object side and a rear lens unit of a negative refractive power is located at the image side of the front lens group, the total length of the whole lens system becomes very short. In FIG. 4, the front lens unit includes the first to third lens units (I), (II) and (III), and the rear lens group includes the fourth lens unit (IV).

(2) A zooming effect can be shared into the second and third lens units (II) (III) and the fourth lens unit (IV), since the fourth lens unit (IV) is shifted to increase the magnification in the zooming operation from the shortest focal length to the longest focal length. Accordingly, even if the refractive power of each lens unit is relatively decreased, the shifting distance in the zooming operation can be small with a decreased number of lens elements.

Next, under the basic construction shown in FIG. 4, desirable conditions to obtain the above effects (1) and (2) will be considered. It is noted that the shortest focal length of the whole lens system is referred to as $f_S$ and the longest focal length thereof as $f_L$. The shortest focal length $f_S$ is normalized as 1. Thus, the longest focal length $f_L$ is equal to Z which represents a zoom ratio. $\phi_i$ (i=1, 2, 3, 4) represents, in turn, the refractive power of each lens unit when the shortest focal length $f_S$ is normalized by 1. Accordingly, $\phi_1>0$, $\phi_2<0$, $\phi_3>0$ and $\phi_4<0$. The shifting distance from an image side to an object side is defined as positive and vice versa as negative, and $\chi_i$ (i=1, 2, 3, 4) represents the shifting distance of each lens unit from the shortest focal length to the longest focal length. (Note that $\chi_1=\chi_4$ in this consideration) And each distance between each adjusting lens unit is assumed to be zero at each shortest or longest focal length. ($\chi_1>0$)

Further, parameters P, $\alpha$ and $\gamma$ are defined as follows. Here, $\alpha$ is a parameter relating mainly to the refractive power of the second lens unit (II), P is a parameter relating mainly to the refractive power of the third lens unit (III), and $\gamma$ is a parameter relating mainly to the refractive power of the third lens unit (III) and the fourth lens unit (IV).

$$\phi_2/\phi_1 = -(1+\alpha) \quad (\alpha > -1) \tag{1}$$
$$\phi_3/\phi_1 = P \quad (P>0) \tag{2}$$
$$\phi_4/\phi_3 = -(1+\gamma/P) \quad (> -1) \tag{3}$$
$$\chi_2 = l\chi_1 \tag{4}$$
$$\chi_3 = m\chi_1 \quad (l<m<1) \tag{5}$$

As shown in FIG. 4, $T_S$ represents a total length of the whole lens system at the shortest focal length (a distance from the first lens unit (I) to the image plane), $T_L$ represents a total length of the whole lens system at the longest focal length (a distance from the first lens unit (I) to the image plane), To represents a lens length of the whole lens system at the shortest focal length (a distance from the first lens unit (I) to the fourth lens unit (IV)) and b represents a back focal length at the shortest focal length.

The focal length of the whole lens system at the shortest focal length is 1 ($=f_S$) and the back focal length thereat is b so that the following equations are fulfilled, $$(\phi_1+\phi_2)+\{1-(\chi_3-\chi_2)$$
$$(\phi_1+\phi_2)\}\phi_3+[1-(\chi_3-\chi_2)$$
$$(\phi_1+\phi_2)-(\chi_1-\chi_3)\{(\phi_1+\phi_2)+\phi_3-(\chi_3-\chi_2)$$
$$(\phi_1+\phi_2)\phi_3\}][\phi_4=1 \tag{6}$$
$$1-(\chi_3-\chi_2)$$
$$(\phi_1+\phi_2)-(\chi_1-\chi_3)\{(\phi_1+\phi_2)+\phi_3-(\chi_3-\chi_2)$$
$$(\phi_1+\phi_2)\phi_3\}=b \tag{7}$$

On the other hand, the focal length $f_L$ at the longest focal length is Z, the compound refractive power of the whole lens system at the longest focal length is 1/Z and the back focal length thereat is $(\chi_4+b)/Z=(\chi_1+b)/Z$ so that the following equation is fulfilled, $$\phi_1+(\phi_2+\phi_3+\phi_4)-(\chi_1+\chi_2)\phi_1(\phi_2+\phi_3+\phi_4)=1/Z \tag{8}$$
$$1-(\chi_1-\chi_2)\phi_1=(\chi_1+b)/Z \tag{9}$$

Here, the refractive powers of each lens units, $\phi_1$, $\phi_2$, $\phi_3$ and $\phi_4$ are converted to the following by defining $\phi_1=\phi_a$ and using the equations (1) to (3);

$$\phi_1=\phi_a \tag{10}$$
$$\phi_2=-(1+\alpha)\phi_a \tag{11}$$
$$\phi_3=P\phi_a \tag{12}$$
$$\phi_4=-(P+\gamma)\phi_a \tag{13}$$

when $\chi_2$, $\chi_3$ shown in the equations (4) and (5), and $\phi_1$ to $\phi_4$ shown in the equations (10) to (13) are substituted for the equations (6) to (9) and the equations (6) to (9) are resolved under the conditions, $P>0$, $\alpha>-1$, $\gamma/P>-1$ and $1<m<1$, the following equations are obtained;

$$\chi_1 = \frac{Z - \frac{1}{\phi_a}}{1 + \alpha + \gamma} - b \quad (14)$$

$$1 - l = \frac{1 + (\alpha + \gamma)Z\phi_a}{Z\phi_a\{Z\phi_a - 1 - (1 + \alpha + \gamma)b\phi_a\}} = \quad (15)$$

$$\frac{1 + (\alpha + \gamma)Z\phi_a}{\{1 + (\alpha + \gamma)\}Z\phi_a^2\chi_1}$$

Here, if $M = (1-m)\chi_1\phi_a$, $L = (1-l)\chi_1\phi_a$ (here, $1 < m < 1$, $L > M > 0$), the following equations are fulfilled:

(i) When $\alpha = 0$, the following equation is obtained;

$$M = \frac{B - \sqrt{B^2 - 4aC}}{2a} \quad (16)$$

Here, M is a solution of a quadratic equation, which includes a positive solution and a negative solution, however, the negative solution is selected under the conditions of P, $\alpha$, $\gamma$, l and m. In the equation (16), B and C are defined as follows, respectively;

$$B = \frac{(1 - b + La)\phi_a\alpha}{1 + (\alpha - b\gamma)\phi_a} + (1 + La) \quad (17)$$

$$C = \frac{(1 - b + La)^2\phi_a}{1 + (\alpha + b\gamma)\phi_a} \quad (18)$$

wherein $(\alpha + b\gamma)\phi_a \neq -1$ must be satisfied. Further, $$P = \frac{1 + (\alpha + b\gamma)\phi_a}{\{(1 - b) + (L - M)\alpha\}\phi_a} \quad (19)$$

is fulfilled. Wherein, $$\alpha \neq \frac{-(1 - b)}{L - M}$$

is fulfilled.
On the other hand,
(ii) When $\alpha = 0$, the following equations are obtained;

$$M = \frac{(1 - b)^2\phi_a}{1 + b\phi_a\gamma} \quad (20)$$

$$P = \frac{1 + b\phi_a\gamma}{(1 - b)\phi_a} \quad (21)$$

wherein since $P > 0$ according to $\gamma \neq -(1/b\phi_a)$ and $(1-b) > 0$ to be mentioned later, $\gamma > -(1/b\phi_a)$ is fulfilled.

Successively, the conditions for accomplishing the desirable compactness of the lens system which is the object of the present invention will be found from the above equations (14), (15), (16) and (19). Firstly, To and $\chi_1$/To are obtained from the equations (14) and (15). Here, $\chi_1$/To = K is defined. To relates directly to the compactness of the whole lens system as explained below, and K relates to the construction of the lens barrel since it represents the shifting distance of the first lens unit in a zooming operation for the lens length. It is noted that $T_S = T_O + b$ and $T_L = T_S + \chi_1$ are apparently fulfilled from FIG. 4. To is obtained by the following equations;

$$T_o = \chi_1 - \chi_2 = (1 - l)\chi_1 \quad (22)$$

$$= \frac{1 + (\alpha + \gamma)Z\phi_a}{\{1 + (\alpha + \gamma)Z\phi_a^2\}}$$

It is clear from the equation (22) that To is independent of the back focal length b. Accordingly, the total length Ts at the shortest focal length can be shortened by making b as small as possible within a limited condition, unless aberration correction is considered. Therefore, it can be seen that the compactness of the whole lens system is depending on only To. Here, the back focal length b at the shortest focal length is defined in accordance with the shortest focal length $f_S$ of the whole lens system. For example, in the case where the zoom lens system is applied for a photographing lens of a single lens reflex camera system, if the shortest focal length is assumed to 50 mm ~ 135 mm, the value of b is defined within a range of about 0.8 ~ 0.25.

With reference to K, the following equation is obtained;

$$K = \chi_1/T_o = 1/(1 - l) \quad (23)$$

$$= \frac{\left\{Z - \frac{1}{\phi_a} - (1 + \alpha + \gamma)b\right\}Z\phi_a^2}{1 + (\alpha + \gamma)Z\phi_a}$$

As apparent from the above equations (22) and (23), if the zoom ratio Z of the zoom lens system and the back focal length b at the shortest focal length are defined, To and K are defined by $\phi_a$, namely, $\phi_1$, and $(\alpha+\gamma)$. Herein, it is clearly understood from the equations (22) and (23) that, under the condition of $f_1 \approx \sqrt{Z}$ ($f_1$ represents the focal length of the first lens unit (I): $\phi_a = \phi_1 = 1/f_1$), To can be decreased in proportion to $f_1$ by decreasing $f_1$, if K is fixed. However, it is opposite to the object of the present invention to make the whole lens system compact by means of increasing the refractive power of the first lens unit (I), since the number of lens elements in the lens unit are increased or the optical performance is deteriorated by increasing the refractive power of the lens unit. Therefore, $f_1$ will be fixed to a proper value in this consideration. Here, $f_1$ is normally defined as $f_1 \approx \sqrt{f_S \cdot f_L} (= \sqrt{Z})$ because of the balance of the shifting distance of the focusing lens unit in a focusing operation toward the closer object and the change in various aberrations thereby, in this type of the zoom lens system.

With reference to $\alpha + \gamma$, since $f_1/Z < 1$ is usually fulfilled, To is monotonely decreased and K is monotonely increased by increasing $\alpha + \gamma$ within a region of $a_1 < \alpha + \gamma < a_2$ wherein $a_1$ and $a_2$ are defined as follows, respectively;

$$a_1 = f_1/Z$$

$$a_2 = (Z - f_1 - b)/Z$$

Therefore, the whole lens system can be made more compact by setting $\alpha + \gamma$ more close to $a_1$. However, if $\alpha + \gamma$ is set closely to $a_1$, the lens barrel can not made since K becomes large infinitely. Thus, it is a condition for obtaining a compact zoom lens system with a practical performance to limit $\alpha+\gamma$ within a range where K is in a desired range and To is small enough. The zoom lens system has enough practicability if K is more than 0.5. If the compactness of the whole lens system is attached importance to, K should be limited to more than about 1.0. If the compactness is not important, K may be less than 0.5.

$\alpha+\gamma=0$ is substituted for the equations (22) and (23), and we get, $$To = 1/Z\phi_a{}^2 = f_1{}^2/Z \tag{24}$$

$$K = (Z - 1/\phi_a - b)Z\phi_a{}^2 = Z/f_1{}^2(Z - f_1 - b) \tag{25}$$

Accordingly, in the range of $Z = 2 \sim 3$ and $b = 0.25 \sim 0.8$, which is the condition of the zoom lens system according to the present invention, if $f_1$ is properly selected, it is a factor for having an almost desired value of K and a small value of To that $\alpha+\gamma$ is in the vicinity of zero.

For example, when $Z=2$, $f_1=1.3$ and when $Z=3$, $f_1=1.6$, the value of K changes according to $b=0.3, 0.4$ and 0.5 as shown in Table 1.

TABLE 1

| Z | b | | |
|---|---|---|---|
|   | 0.3 | 0.4 | 0.5 |
| 2 ($f_1 = 1.3$) | 0.47 | 0.36 | 0.24 |
| 3 ($f_1 = 1.6$) | 1.29 | 1.17 | 1.05 |

Figure 5:
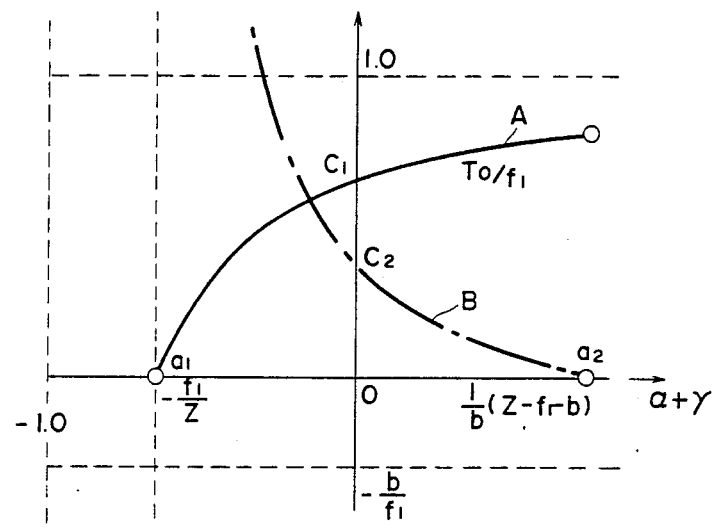
FIG. 5 represents a graph showing the changes in $T_0/f_1$ and K according to the change in $\alpha+\gamma$ when $Z=2$ and $b=0.4$, respectively.

FIG. 5 represents the changes of $To/f_1$ and K for $\alpha+\gamma$ in case of $f_1=1.3$ under the conditions of the zoom ratio $Z=2$ and the back focal length $b=0.4$ at the shortest focal length. In the figure, a horizontal axis represents $\alpha+\gamma$, a vertical axis represents $To/f_1$ or K. A curve A represents the change of $To/f_1$ for $\alpha+\gamma$, wherein $To/f_1$ is zero when $\alpha+\gamma=a_1$, namely, $\alpha+\gamma=-f_1/Z$. On the other hand, when $\alpha+\gamma=0$, $To/f_1=C_1$, namely, $To/f_1=f_1/Z$ is obtained. The curve A is a hyperbola having asymptotes of $To/f_1=1.0$ and $\alpha+\gamma=-1.0$, respectively. A curve B represents the change of K for $\alpha+\gamma$, wherein $K=0$ is obtained when $\alpha+\gamma=a_2$, namely, $\alpha+\gamma=(Z-f_1-b)/b$, and $K=C_2$, namely, $K=Z(Z-f_1-b)/f_1{}^2$ is obtained when $\alpha+\gamma=0$. The curve B is a hyperbola with asymptotes of $K=-b/f_1$ and $\alpha+\gamma=-f_1/Z$ respectively. From these curves, it is understood that, when $\alpha+\gamma=0$, an ultra compact zoom lens system is obtained because of $T_S=1.25$ and $K=0.35$.

Figure 6:
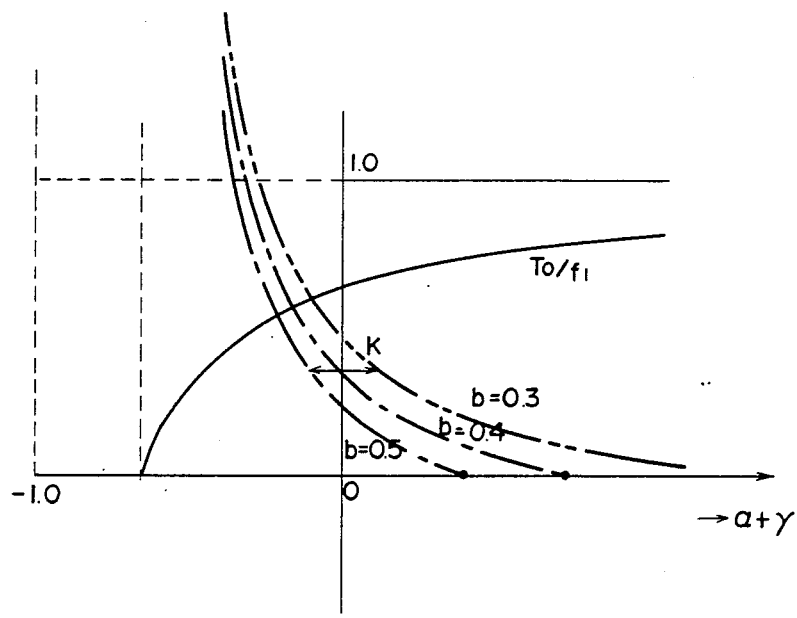
FIG. 6 represents a graph showing the changes of $T_0/f_1$ and K for $\alpha+\gamma$ when $Z=2$ and $b=0.3$, $b=0.4$, and $b=0.5$, respectively.

FIG. 6 represents the change of K for $\alpha+\gamma$ in case of $b=0.3, 0.4$ and 0.5, respectively, under the conditions of $Z=2$, $f_1=1.3$. (To is constant as understood from the equation (22).) As apparent from the graph, if K is considered as a constant value, $\alpha+\gamma$ is shifted toward the positive when b becomes small, and it is shifted toward the negative when b becomes large.

Figure 7:
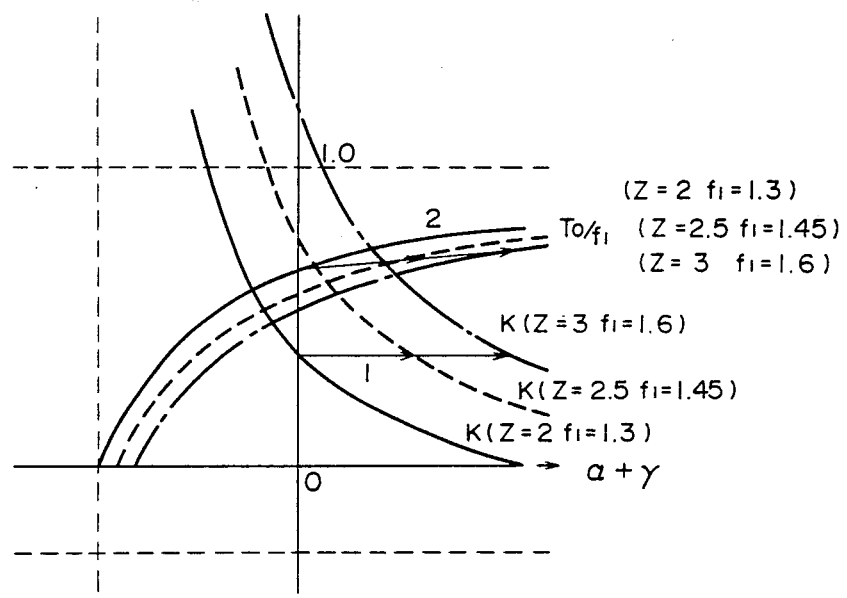
FIG. 7 represents a graph showing the changes of $T_0/f_1$ and K for $\alpha+\gamma$ when $Z=3$ and $b=0.4$, respectively.

On the other hand, FIG. 7 represents the change of $To/f_1$ and K for $\alpha+\gamma$ in case of changing Z to 2, 2.5 and 3, respectively under the condition of $b=0.4$. The $f_1$ is determined according to each Z based on the above condition ($f_1 \approx \sqrt{Z}$). As apparent from the Figure, if K is considered as a constant value, $\alpha+\gamma$ is shifted toward the positive as Z becomes large. (As shown by an arrow 1 in the Figure)

At that time, as apparent from the figure, $To/f_1$ is almost constant.

Accordingly, the factor of $\alpha+\gamma$ is determined in the vicinity of zero and as follows;

(a) When the back focal length b becomes smaller (the focal length at the shortest focal length becomes long), $\alpha+\gamma$ has a larger value than zero (positive value) in the vicinity of zero, and when b becomes larger (the focal length at the shortest focal length becomes short), $\alpha+\gamma$ has a smaller value (negative value) in the vicinity of zero.

(b) When the zoom ratio Z becomes larger, $\alpha+\gamma$ has a larger value (positive value) in the vicinity of zero.

Thus, it would be clear from the above consideration that $\alpha+\gamma$ must be in the vicinity of zero in order to achieve a relatively small shifting distance of respective lens units, especially the first lens unit (I), in a zooming operation and to achieving a relatively small lens length (the distance between the first and fourth lens units) at the shortest focal length. More concretely, the following condition is required for achieving the desirable compactness;

$$(I) \quad -0.7\frac{f_1}{Z} < \alpha + \gamma < 0.9\frac{Z - f_1 - b}{b} \tag{26}$$

, wherein, from the equation (2)

$$\alpha = -(1 + \phi_2/\phi_1) \tag{27}$$

from the equations (1) and (3)

$$\gamma = -(\phi_3 + \phi_4)/\phi_1 \tag{28}$$

, thus, $\alpha+\gamma$ is shown as follows;

$$\alpha + \gamma = -\{1 + (\phi_2 + \phi_3 + \phi_4)/\phi_1\} \tag{29}$$

wherein, $\phi_1, \phi_2, \phi_3$ and $\phi_4$ represent the refractive powers of the first to fourth lens units, respectively.

More concretely, the following condition is required for achieving the desirable compactness instead of the condition (I):

$$(I') \quad -0.5 < \alpha + \gamma < 2.0 \tag{26'}$$

If the lower limit of the condition (I) or (I') is violated, the shifting distance of the first lens unit becomes undesirably large, comparing with the lens length (To), as a result, it becomes difficult to construct a lens barrel. On the other hand, if an upper limit of the condition (I) is violated, the desirable compactness of the present invention can not be achieved.

Next, we consider the condition for decreasing the number of lens elements of respective lens unit with a relatively small power of respective lens unit under the above condition (I). First the following equations are fulfilled from the equations (10), (11), (12), (13), (16), (19) and (22), $$\phi_1 = \phi_a \tag{30}$$

$$\phi_2 = -(1 + \alpha)\phi_a \tag{31}$$

$$\phi_3 = P\phi_a = \frac{1 + (\alpha + b\gamma)\phi_a}{(1 - b) + (1 - M)\alpha} \tag{32}$$

$$\phi_4 = -(P + \alpha)\phi_a = -\left(\frac{1 + \phi_a(\alpha + \gamma) + (L - M)\phi_a\alpha\gamma}{(1 - b) + (L - M)\alpha}\right) \tag{33}$$

$$(1 - l)\chi_1 = L/\phi_a \tag{34}$$

wherein, $L = \frac{1 + (\alpha + \gamma)\phi_a}{\{1 + (\alpha + \gamma)\}Z\phi_a} \tag{35}$ -continued $$(1 - m)\chi_1 = M/\phi_a \quad (36)$$

wherein, M is represented in the equation (16).

If the above equations (30), (31), (32), (33), (34) and (36) are developed under $\alpha + \gamma = 0$, the following equations are obtained.

$$\phi_1 = \phi_a \quad (37)$$

$$\phi_2 = -(1+\alpha)\phi_a \quad (38)$$

$$\phi_3 = \frac{1 + (1 - b)\phi_a \alpha}{(1 - b) + (Lo - Mo)\alpha} \quad (39)$$

$$\phi_4 = -\left\{ \frac{1 - (Lo - Mo)\phi_a \alpha^2}{(1 - b) + (Lo - Mo)\alpha} \right\} \quad (40)$$

$$To = (1 - l)\chi_1 = Lo/Mo \quad (41)$$

$$Tm = (1 - m)\chi_1 = Mo/\phi_a \quad (42)$$

wherein, Tm is the distance between the third and fourth lens units at the shortest focal length, and Lo is a value of L shown in the equation (35) when $\alpha + \gamma = 0$. From the equations (14) and (15), $\chi_{10} = Z - 1/\phi_a - b$ and $Lo = 1/Z\phi_a$ are fulfilled. Assume that $Mo = (1-m)\chi_1\phi_a$ is fulfilled. ($0 < Mo < Lo$)

(i) When $\alpha = 0$, from the equation (20), $$Mo = (1-b)^2\phi_a \quad (43)$$

is obtained.

(ii) When $\alpha \neq 0$, $$Mo = 1/2\alpha\{Bo - \sqrt{Bo^2 - 4\alpha Co}\} \quad (44)$$

is obtained, wherein, $$Bo = \frac{(1 - b + Lo\alpha)\phi_a \alpha}{1 + (1 - b)\phi_a \alpha} + (1 + Lo\alpha) \quad (45)$$

$$Co = \frac{(1 - b + Lo\alpha)^2 \phi_a}{1 + (1 - b)\phi_a \alpha} \quad (46)$$

It is noted that Mo is a solution of the quadratic equation which has positive and negative signs, however, a negative sign is selected from the conditions of P, $\alpha$, $\gamma$, l, and m. Here, Lo, Mo, $\chi_{10}$, Bo, and Co are values of L, M, $\chi$, B and C when $\alpha + \gamma = 0$.

From the equations (41) and (42), it can be seen that Lo is independent of $\alpha$ under the condition of $\alpha + \gamma = 0$. On the other hand, Mo is equal to $(1-b)^2\phi_a$ when $\alpha = 0$ and is determined only in accordance with the back focal length b at the shortest focal length. When $\alpha \neq 0$, as $\alpha$ comes close to $-(1-b)/Lo$, Mo becomes equal to zero, and as $\alpha$ becomes large, Mo becomes equal to Lo.

From the equations (37) to (40), it is understood that the following are fulfilled under the condition of $\alpha + \gamma = 0$.

(1) The refractive power $\phi_2$ of the second lens unit is in proportion only to the refractive power $\phi_1$ ($=\phi_a$) of the first lens unit and $\alpha$, without depending on both of the zoom ratio Z and the back focal length b at the shortest focal length.

(2) The absolute value of the refractive powers of the third and fourth lens units become $1/(1-b)$ when $\alpha = 0$ (and $\gamma = 0$), depending only on the back focal length b at the shortest focal length other than the refractive power of the first lens unit. When $\alpha$ comes close to $-(1-b)/Lo$, the absolute value of the refractive powers, $\phi_3$ and $\phi_4$ of the third and fourth lens units rapidly become large. This is because the denominator of the equations (39) and (40) comes up to zero. From equations (39) and (40), it is understood that in the range of $\alpha$ nearly equal to zero, the absolute value of $\phi_3$ and $\phi_4$ depends on the back focal length b at the shortest focal length, while it does not depend directly on the zoom ratio Z.

From the above description, when the value of $(1-b)$ is not zero, it is required that $\alpha$ is nearly equal to zero as a condition for relatively small refractive powers of respective lens units and a proper location of respective lens units. When $\alpha + \gamma = 0$ and $\alpha = 0$ (namely, $\gamma = 0$), the equations (39) to (42) are respectively expressed only by the zoom ratio Z and the back focal length b at the shortest focal length as follows.

$$\phi_1 = \phi_a \quad (47)$$

$$\phi_2 = -\phi_a \quad (48)$$

$$\phi_3 = 1/(1-b) \quad (49)$$

$$\phi_4 = -\{1/(1-b)\} \quad (50)$$

$$To = 1/Z\phi_a^2 \quad (51)$$

$$Tm = (1-b)^2 \quad (52)$$

Figure 8:
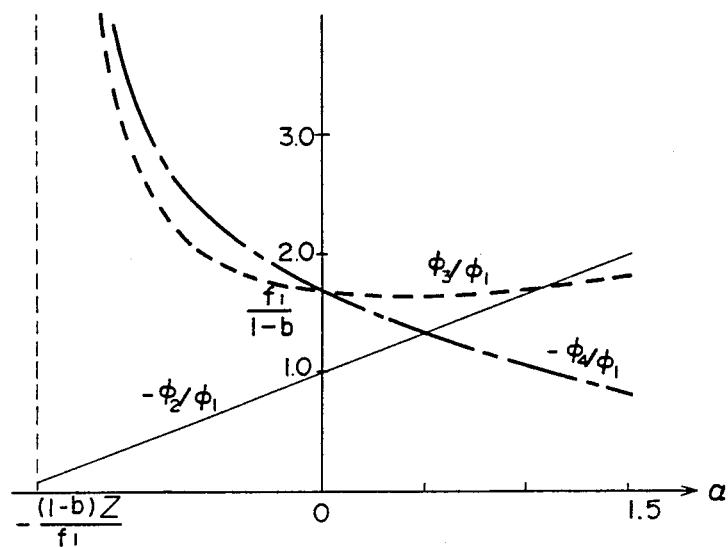
FIG. 8 represents a graph showing the changes of $\phi_2/\phi_1$, $\phi_3/\phi_1$, and $\phi_4/\phi_1$ for $\alpha$, respectively.

FIG. 8 represents a graph showing the change of $\phi_2/\phi_1$, $\phi_3/\phi_1$, and $\phi_4/\phi_1$ for $\alpha$ under the condition of $Z=2$ and $b=0.4$ same as in FIG. 5.

When $\alpha = 0$, if $f_1 = 1/\phi_1 = 1.3$ is set, $f_2 = 1/\phi_2 = -1.3$, $f_3 = 1/\phi_3 = 0.6$ and $f_4 = 1/\phi_4 = -0.6$ are obtained so that each lens unit can have a relatively small refractive power.

Figure 9:
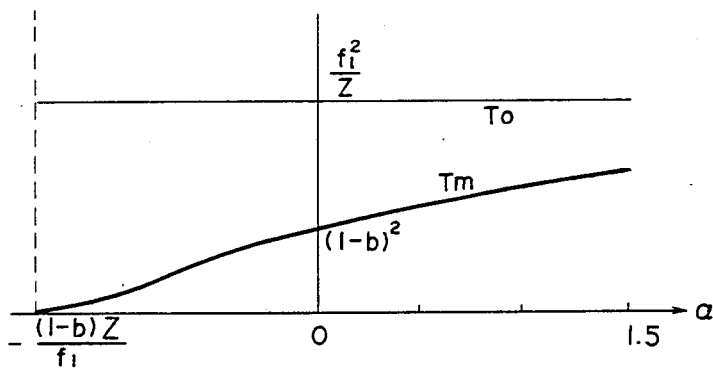
FIG. 9 represents a graph showing the changes of To and Tm for $\alpha$, respectively.

FIG. 9 represents a graph showing the change of To and Tm for $\alpha$ under the above conditions. From the drawing, we can find that To is always equal to $f_1^2/Z$ independently of $\alpha$ and Tm increases in proportion to $\alpha$, resulting in $(1-b)^2$ when $\alpha = 0$.

Figure 10:
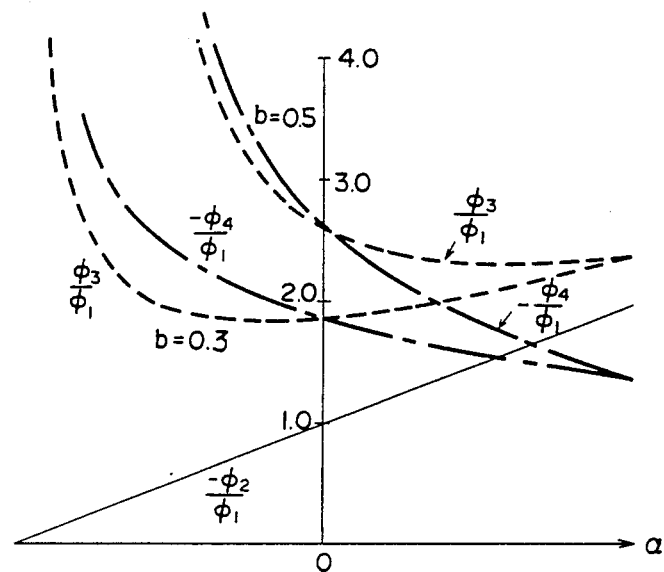
FIG. 10 represents a graph showing the changes of $\phi_2/\phi_1$, $\phi_3/\phi_1$ and $\phi_4/\phi_1$ for $\alpha$ when $b=0.3$ and $b=0.5$, respectively.
Figure 11:
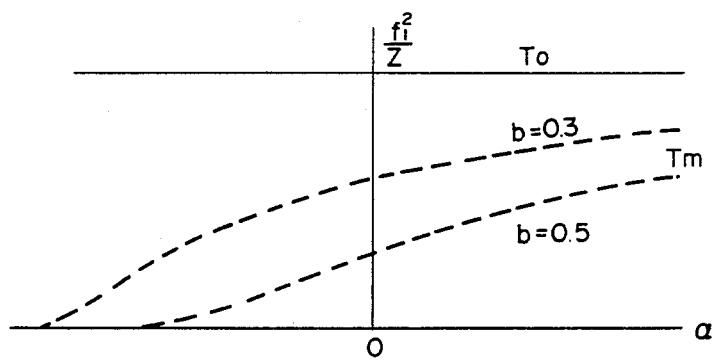
FIG. 11 represents a graph showing the changes of To and Tm for $\alpha$ when $b=0.3$ and 0.5, respectively.

FIG. 10 represents the change of $\phi_2/\phi_1$, $\phi_3/\phi_1$, and $\phi_4/\phi_1$ and FIG. 11 represents the change of To and Tm under the conditions $Z=2$, and $b=0.3$ and 0.5, respectively.

Comparing with the cases of FIGS. 8 and 9 ($b=0.4$), if b increases, the advantageous condition of each refractive power of each lens unit will be shifted toward the positive, and if b decreases, it will be shifted toward the negative.

Figure 12:
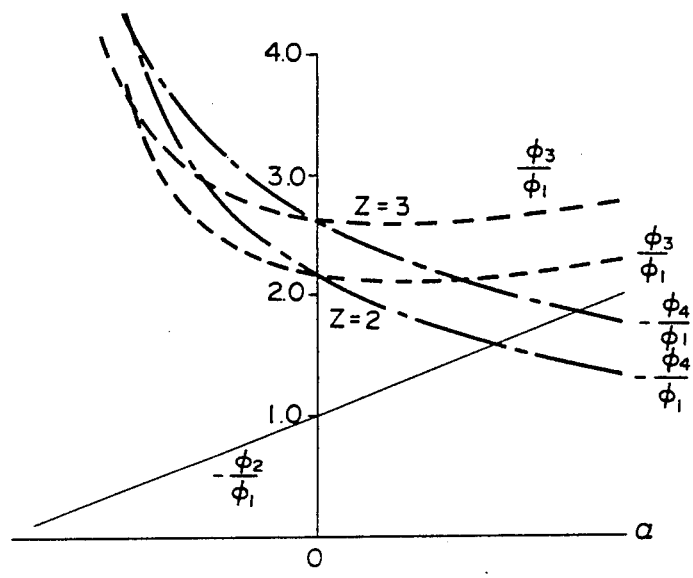
FIG. 12 represents a graph showing the changes of $-\phi_2/\phi_1$, $\phi_3/\phi_1$ and $-\phi_4/\phi_1$ for $\alpha$ when $Z=2$ and $Z=3$, respectively.
Figure 13:
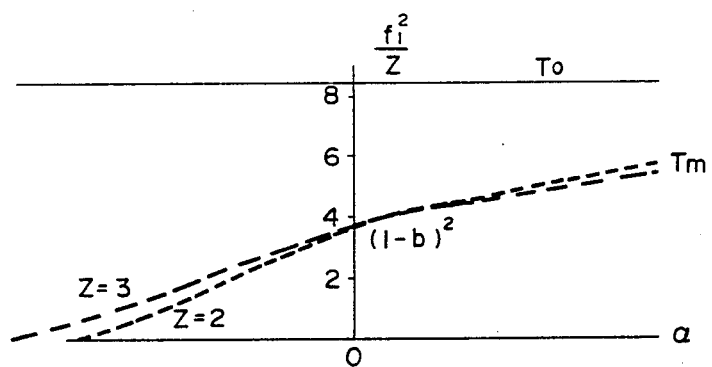
FIG. 13 represents a graph showing the changes of To and Tm for $\alpha$ when $Z=2$ and $Z=3$, respectively.

FIG. 12 represents the change of $\phi_2/\phi_1$, $\phi_3/\phi_1$, and $\phi_4/\phi_1$ and FIG. 13 represents the change of To and Tm under the condition of $Z=3$ ($b=0.4$), wherein a graph in case of $Z=2$ ($b=0.4$) is also shown for comparison. With reference to $f_1$, $f_1$ is defined to 1.6 from the above conditions.

From FIGS. 12 and 13, it can be seen that the zoom ratio Z is almost independent of $\alpha$, although its change causes the change in the refractive powers of the third and fourth lens units. Accordingly, $\alpha$ must be nearly equal to zero and must be determined in accordance with the zoom ratio Z and the back focal length b.

(I) if the back focal length b becomes smaller (the focal length at the shortest focal becomes long), $\alpha$ becomes smaller (negative value) in the vicinity of zero, and if b becomes longer (the focal length at the shorter focal length), α becomes larger (positive value) in the vicinity of zero.

(II) the value of α is not directly dependent on the the zoom ratio Z.

Consequently, under the condition that b is not nearly equal to 1, α (and γ) having a value nearly equal to zero is a condition for a relatively small refractive power of respective lens unit with the decreased number of lens elements.

More concretely, a couple of the following conditions (II) (III) or (II') (III') should be fulfilled in order to make the refractive powers of each lens units relatively weak and to reduce the number of the lens elements in each unit;

$$\text{(II)} \quad -0.5 \frac{Z(1-b)}{f_1} < \alpha < 1.5 \tag{53}$$

$$\text{(III)} \quad -1.5 < \gamma < 0.5 \frac{Z(1-b)}{f_1} \tag{54}$$

or $$\text{(II')} \quad -0.5 < \alpha < 1.5 \tag{53'}$$

$$\text{(III')} \quad -1.5 < \gamma < 0.5 \tag{54'}$$

If the lower limit of condition (II) or (II') or the upper limit of condition (III) or (III') is violated, especially the refractive powers of the third and fourth lens units become undesirable strong. If the upper limit of condition (II) or (II') or the lower limit of condition (III) or (III') is violated, especially the refractive power of the second lens unit becomes strong. As a result, in both cases, the object of the present invention can not be accomplished.

Further, in order to correct the aberrations preferably it is desirable to fulfill the following conditions;

$$\text{(IV)} \quad 0 < (1/\beta_{2L}) < 1 \tag{55}$$

$$\text{(V)} \quad 0 < \beta_{3L} < 1 \tag{56}$$

$$\text{(VI)} \quad 0 < (1/\beta_{4L}) < 1 \tag{57}$$

wherein, $\beta_{2L}$ represents a lateral magnification of the second lens unit at the longest focal length, $\beta_{3L}$ represents the same of the third lens unit at the longest focal length, and $\beta_{4L}$ represents the same of the fourth lens unit at the longest focal length.

Conditions (IV) to (VI) define the lateral magnifications of the second to fourth lens units at the longest focal length, respectively. In a telephoto zoom lens system, it is required to correct the aberration preferably especially at the longest focal length. In particular, it is required to fulfill the above conditions (IV) to (VI) for setting the lateral magnifications of respective lens units in order to correct spherical aberration well.

Further, according to the present invention, it is desirable to fulfill the following conditions.

$$\text{(VII)} \quad 0.2 < (f_{S123}|f_4|) < 2.0 \tag{58}$$

$$\text{(VIII)} \quad 1.15 < (\beta_{L4}/\beta_{S4}) < 2.0 \tag{59}$$

$$\text{(IX)} \quad 0.1 < (\Delta d_{34}/f_S) < 1.0 \tag{60}$$

wherein, $f_{S123}$ represents a compound focal length of the first lens unit to the third lens unit at the shortest focal length, $f_4$ represents a focal length of the fourth lens unit, $\beta_{L4}$ represents a lateral magnification of the fourth lens unit at the longest focal length, $\beta_{S4}$ represents a lateral magnification of the fourth lens unit at the shortest focal length, $\Delta d_{34}$ represents a decreased distance between the third lens unit and the fourth lens unit in a zooming operation from the shortest focal length to the longest focal length, and $f_S$ represents a focal length of the whole lens system at the shortest focal length.

The condition (VII) defines a telephoto type at the shortest focal length. If its upper limit is violated, the telephoto type becomes so extreme that a positive distortion can not be corrected. On the other hand, if its lower limit is violated, the desirable compactness will not be accomplished and there will be a small effect for changing magnification by the fourth lens unit.

The conditions (VIII) and (IX) define the zooming effect of the fourth lens unit. In the condition (VIII), if its upper limit is violated, the fourth lens unit will have a strong refractive power or will be largely shifted so that it will be difficult to make the fourth lens unit relatively simple in construction as well as to correct the balance of field curvature in the zooming operation. On the other hand, if its lower limit is violated, the zooming effect will be shared too much to the lens units except for the fourth lens unit and a compact zoom lens system as the object of the present invention can not be achieved.

Meanwhile, if the upper limit of the condition (IX) is violated, the axial distance between the third and fourth lens units at the shortest focal length becomes large, this results in failure to obtain enough illumination at the shortest focal length. Additionally, it becomes difficult to make the fourth lens unit simple in construction and to correct the field curvature with a good balance in the zooming operation. If the lower limit of the condition (IX) is violated, there is no practical zooming effect of the fourth lens unit.

Further, according to the present invention, the compactness of the lens system can be maintained by fulfilling the following conditions instead of the aforementioned conditions (II) and (III).

$$\text{(X)} \quad 1 < \alpha < 3 \tag{61}$$

$$\text{(XI)} \quad -3 < \gamma < 1 \tag{62}$$

Conditions (X) and (XI) are effective especially in the case that the back focal length b is almost equal to 1, namely in the case of a relatively short value of $f_S$.

In the above equations (39) and (40), if b comes close to 1, their denominators come close to zero when α is almost equal to zero so that the third and fourth lens units have the increased refractive power. Accordingly, when α and γ are set within the range of equations (61) and (62), the refractive powers of the second, third and fourth lens units can be well balanced. The first lens unit and the fourth lens unit can be moved integrally with each other during the zooming operation while securing the above second and third lens units during the zooming operation, which are quite advantageous for simplifying the construction of the barrel.

Furthermore, in the present invention, the shifting mechanism of the lens units can be made simple by means of shifting the first and fourth lens units integrally with each other in the zooming operation. The shifting mechanism of the lens groups also can be made simple by means of fixing at least one of the second and third lens units in a zooming operaion. It is effective for make the lens barrel simple in construction by making the shifting mechanism simple.

Next, in the present invention, explanation of the lens unit movement will be described below in the most typical case of $\alpha=\gamma=0$. If the zoom ratio Z and the back focal length b are determined, $\phi_1$, $\phi_2(=-\phi_1)$, $\phi_3$, $\phi_4(=-\phi_3)$, $\chi_1$, $\chi_2$ and $\chi_3$ are represented by using a parameter m from the equation (14), (15), and (47) to (52), respectively. Here, respective parameters $\phi_1$ to $\phi_4$ and $\chi_1$ to $\chi_3$ are expressed in more simple forms by converting m into $\epsilon$ wherein $\epsilon=1/(1-m)$, respectively shown as follows;

$$1/\phi_1 = -(1-b)^2\epsilon + (Z-b)(=-1/\phi_2) \quad (63)$$

$$1/\phi_3 = (1-b)(=-1/\phi_4) \quad (64)$$

$$\chi_3 = 2t(1-b)^2\epsilon \quad (65)$$

$$\chi_2 = -1/Z\{(1-b)^4\epsilon^2 - (1-b)^2(3Z-2b)\epsilon + (Z-b)^2\} \quad (66)$$

$$\chi_3 = (1-b)^2\epsilon - (1-b)^2 \quad (67)$$

$$T_0 = \frac{(1-b)^4}{Z}\left(\epsilon - \frac{Z-b}{(1-b)^2}\right)^2 \quad (68)$$

Here, from $1 < m < 1$, $\epsilon$ is limited as follows;

$$0 < \epsilon < \frac{Z-b}{(1-b)^2} - \frac{\sqrt{Z}}{(1-b)} \quad (69)$$

Figure 14:
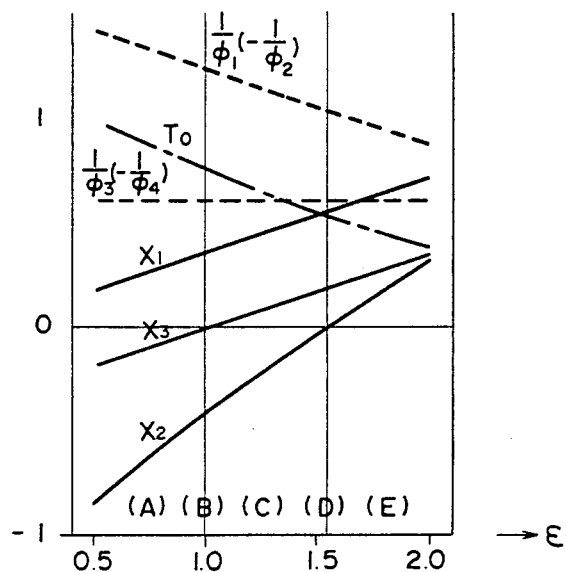
FIG. 14 represents a graph showing the changes of $1/\phi_1$, $-1/\phi_3$, $\chi_1$, $\chi_2$, $\chi_3$ for $\epsilon$, respectively.

FIG. 14 shows changes of $\phi_1$ to $\phi_4$, $\chi_1$ to $\chi_3$ and To for $\epsilon$ when $Z=2$ and $b=0.4$. To is monotonely decreased corresponding to an increase of $\epsilon$ within the limited region shown in the equation (69), when $1-b>0$. Thus, the larger $\epsilon$ is, the smaller To is. However, if $\epsilon$ becomes large, $\chi_1$ to $\chi_3$ becomes large respectively, this might cause difficulty in construction of the lens barrel.

Figure 15:
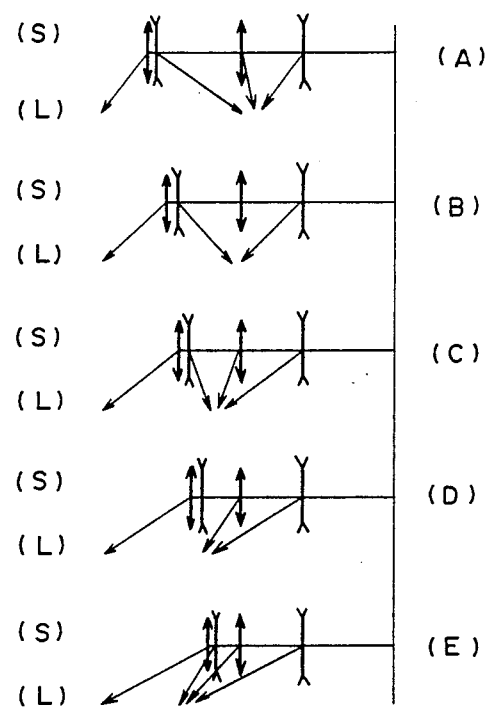
FIG. 15 represents schematic views for showing the movement of each of the lens units from the shortest focal length (S) to the longest focal length (L) in the condition (A) to (E) shown in FIG. 14, respectively.
Figure 16:
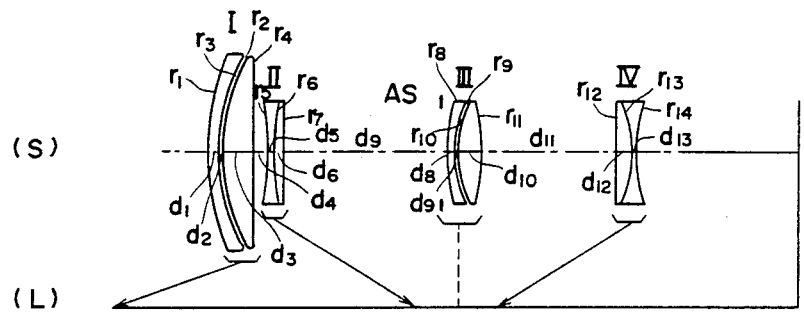
FIGS. 16 to 32 represent cross sectional views of the lens system at the shortest focal length (S) with showing the lens movements toward the longest focal length (L) in embodiments 1 to 17 of the present invention, respectively.
Figure 17:
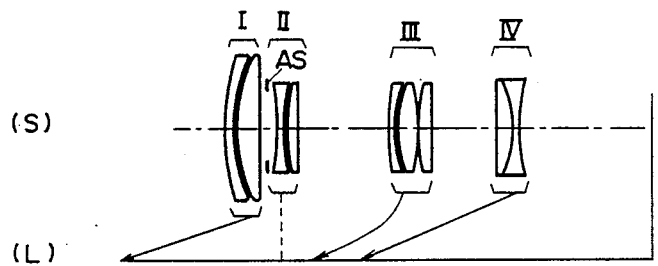
Figure 18:
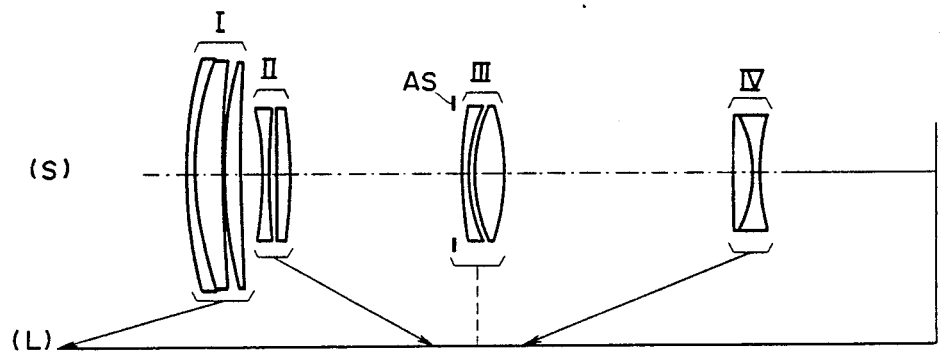
Figure 19:
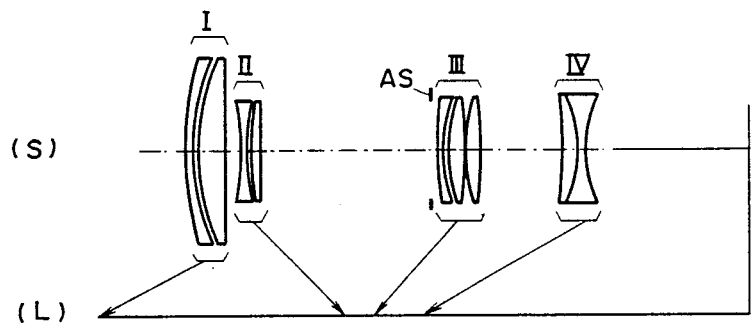
Figure 20:
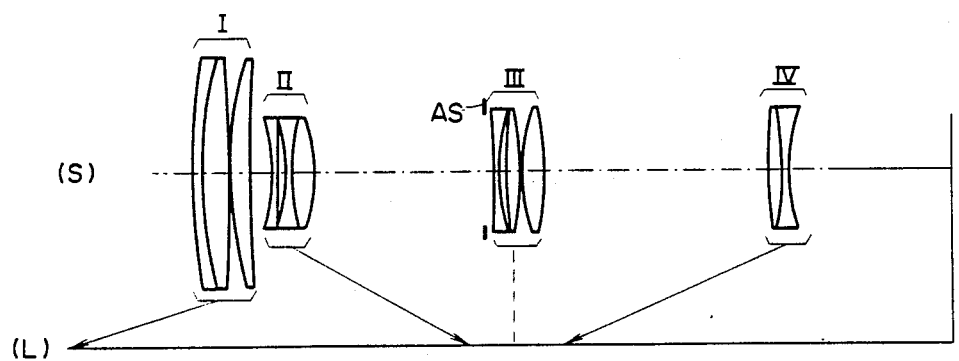
Figure 21:
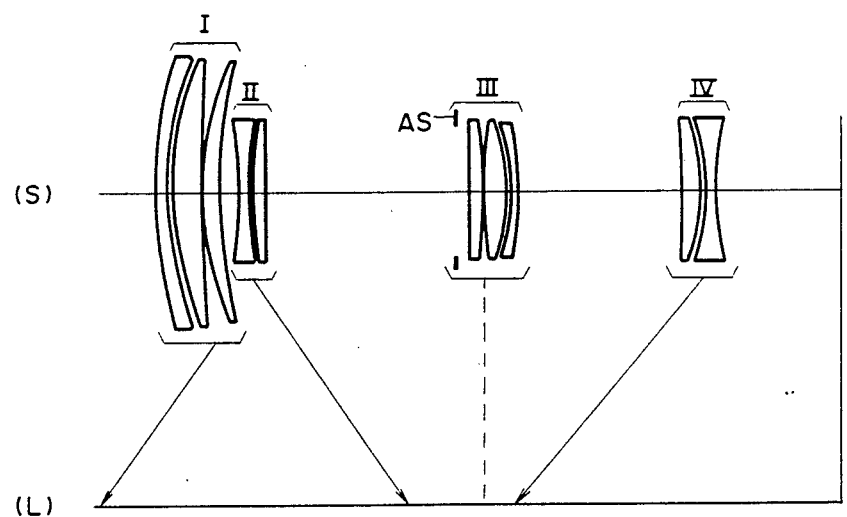
Figure 22:
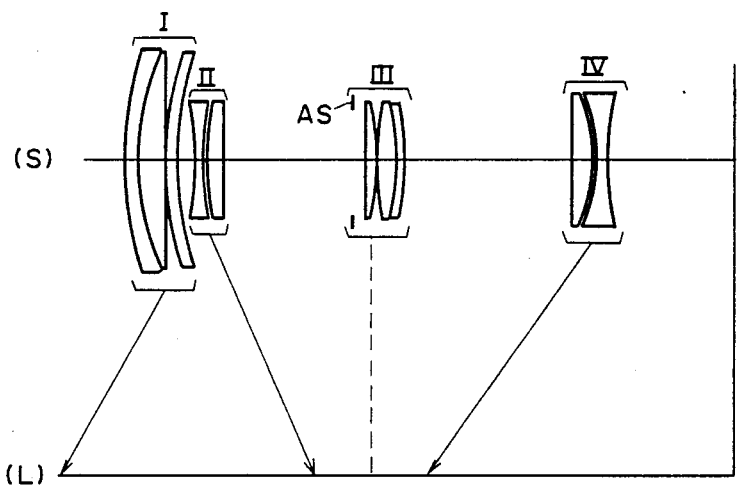
Figure 23:
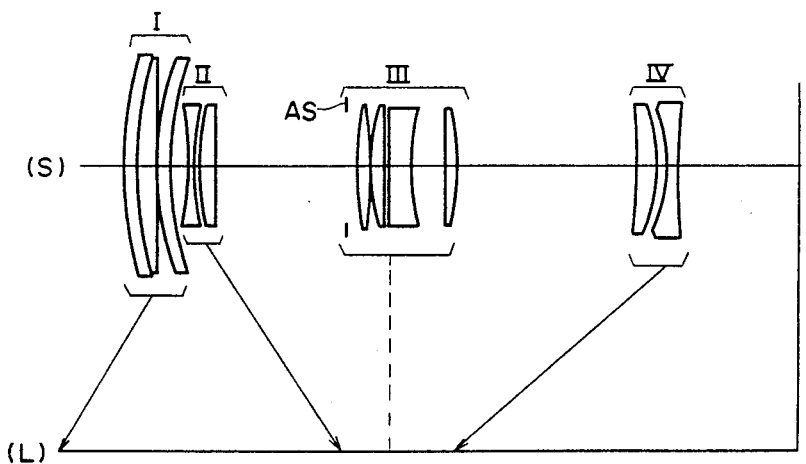
Figure 24:
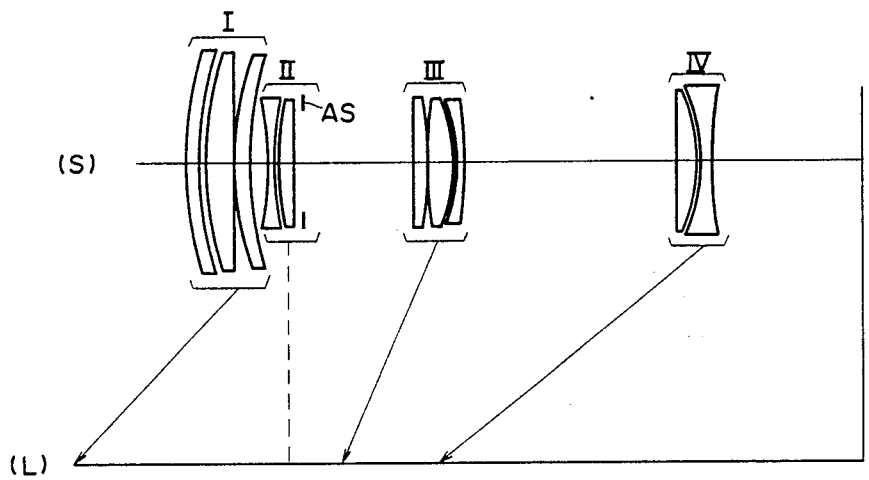
Figure 25:
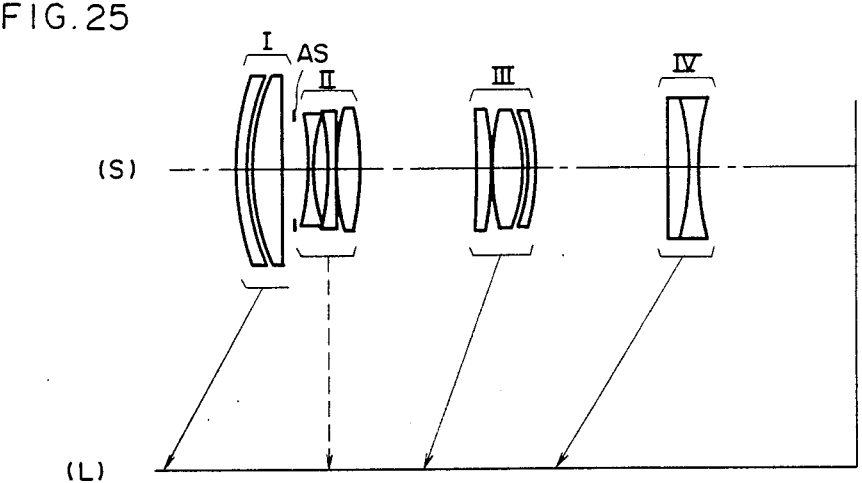
Figure 26:
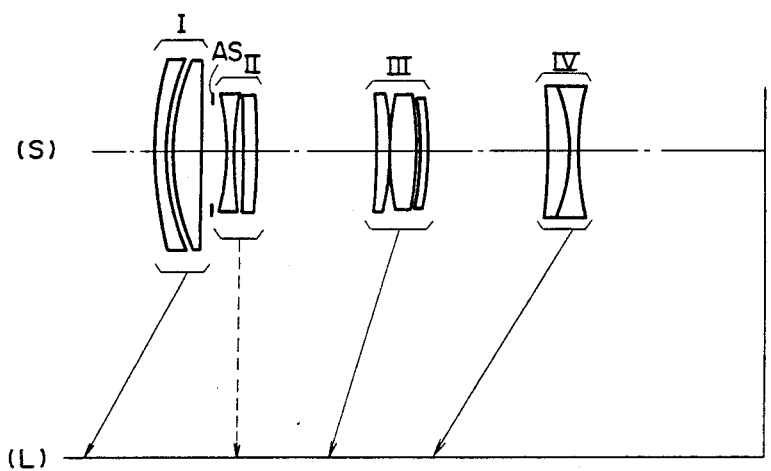
Figure 27:
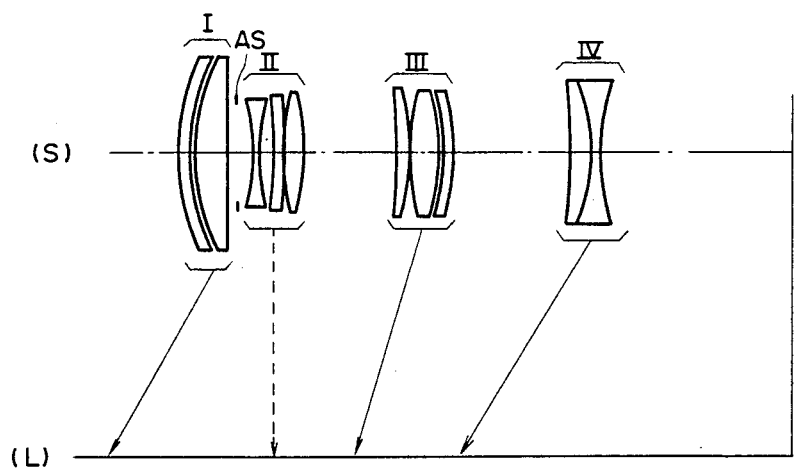
Figure 28:
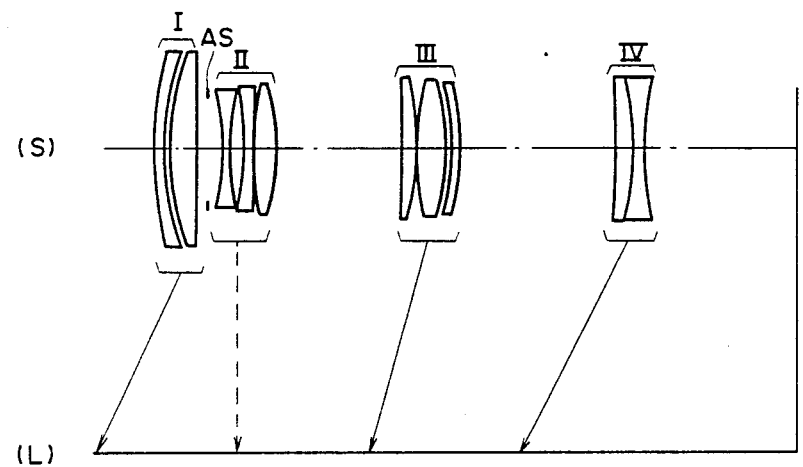
Figure 29:
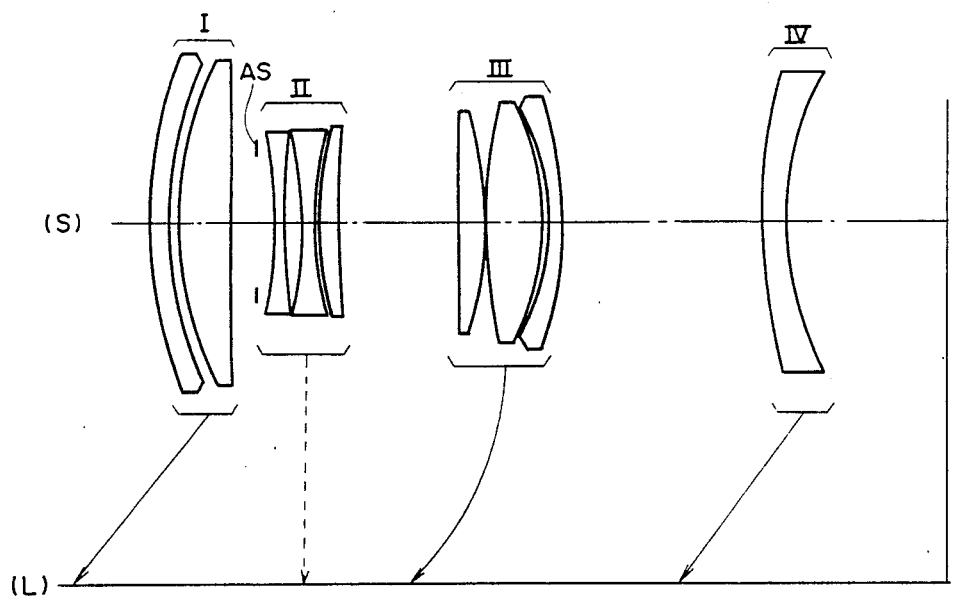
Figure 30:
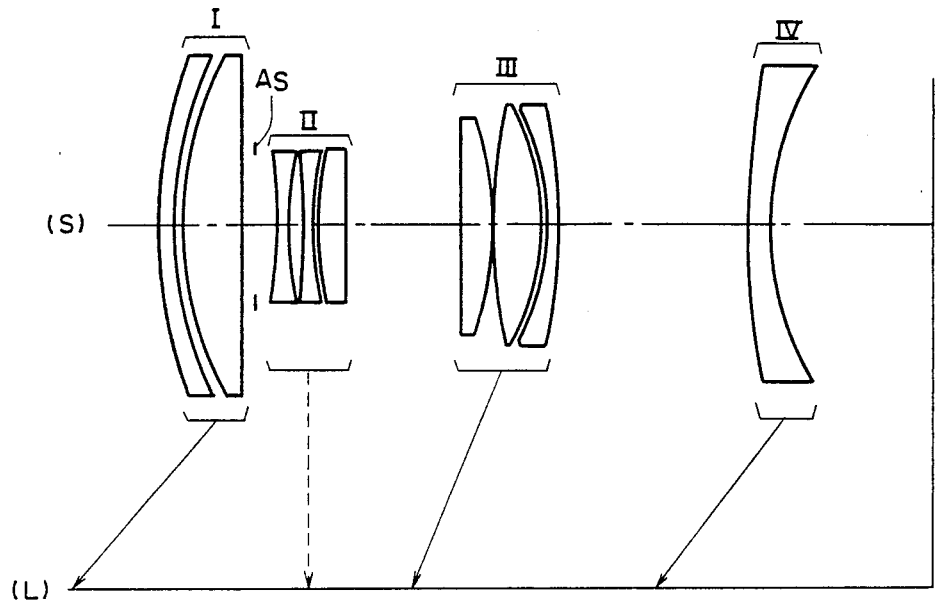
Figure 31:
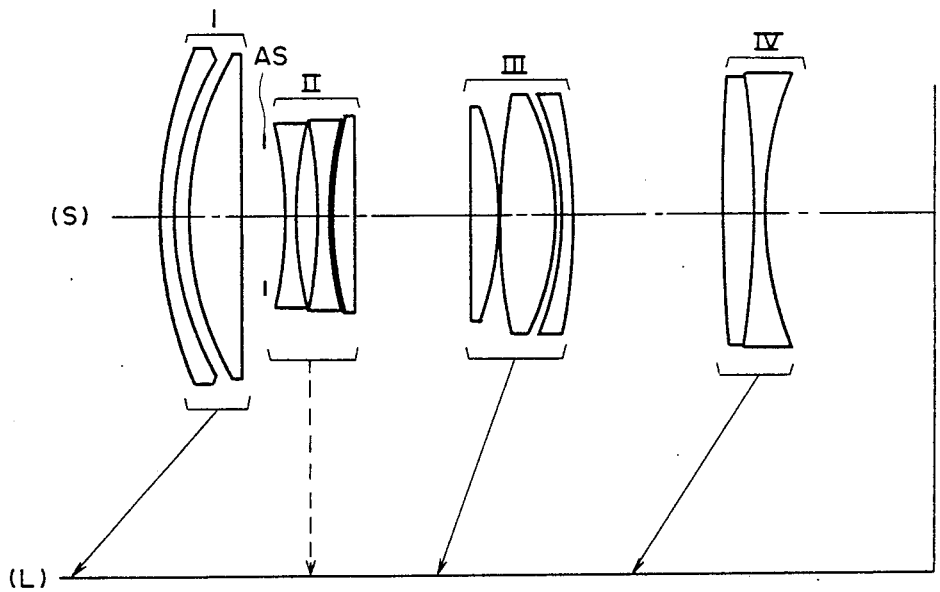
Figure 32:
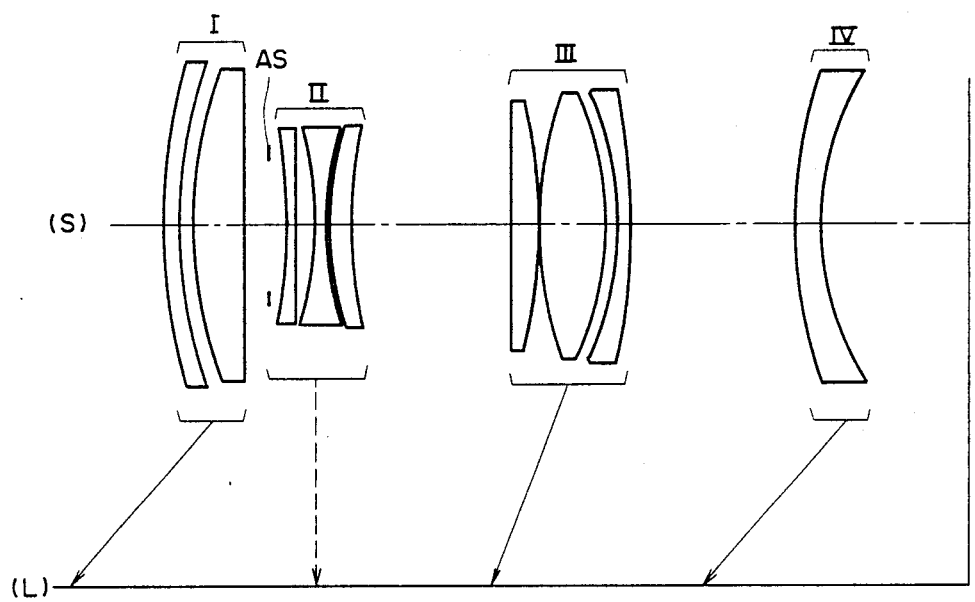
Figure 33:
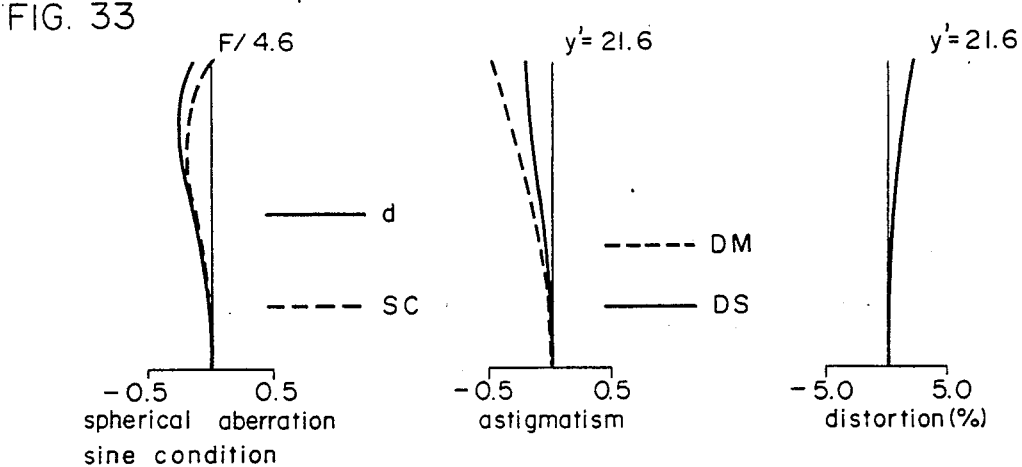
FIG. 33 represents graphs showing various aberrations of the embodiment 1 at the shortest focal length.
Figure 34:
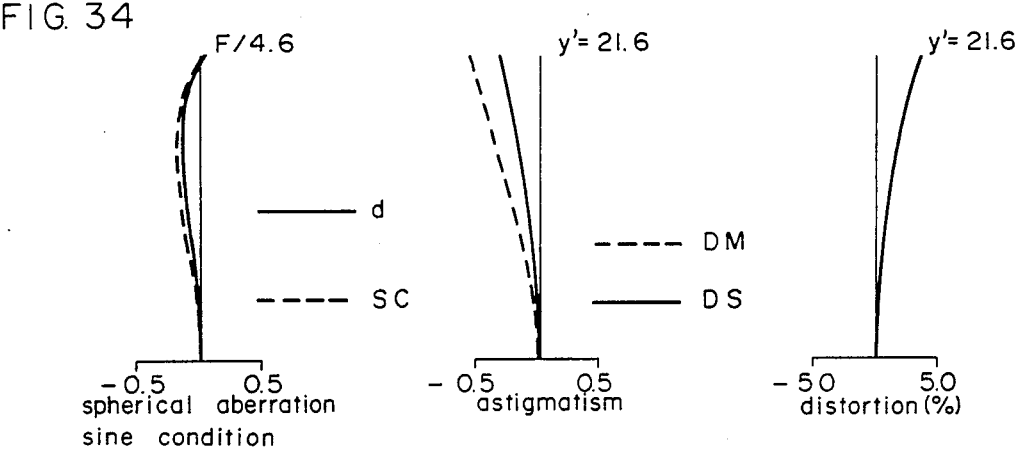
FIG. 34 represents graphs showing various aberrations of the embodiment 1 at a medium focal length.
Figure 35:
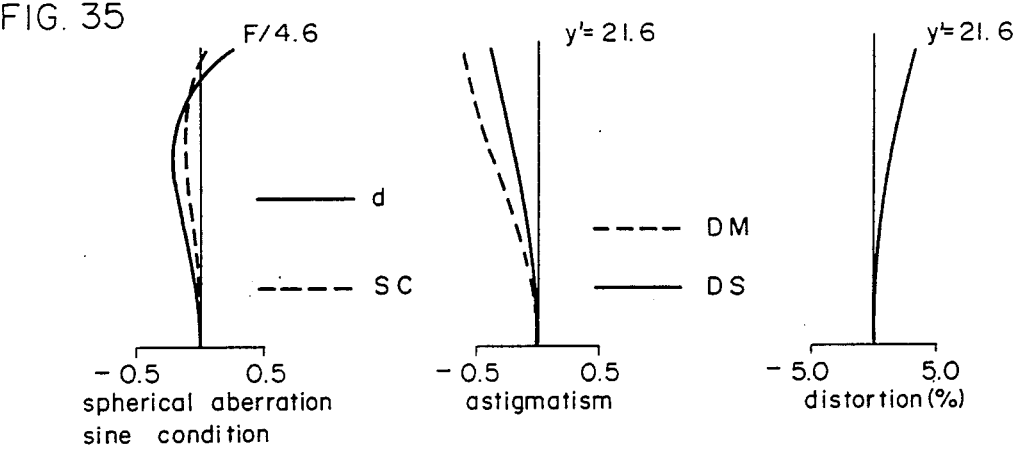
FIG. 35 represents graphs showing various aberrations of the embodiment 1 at the longest focal length.
Figure 36A:
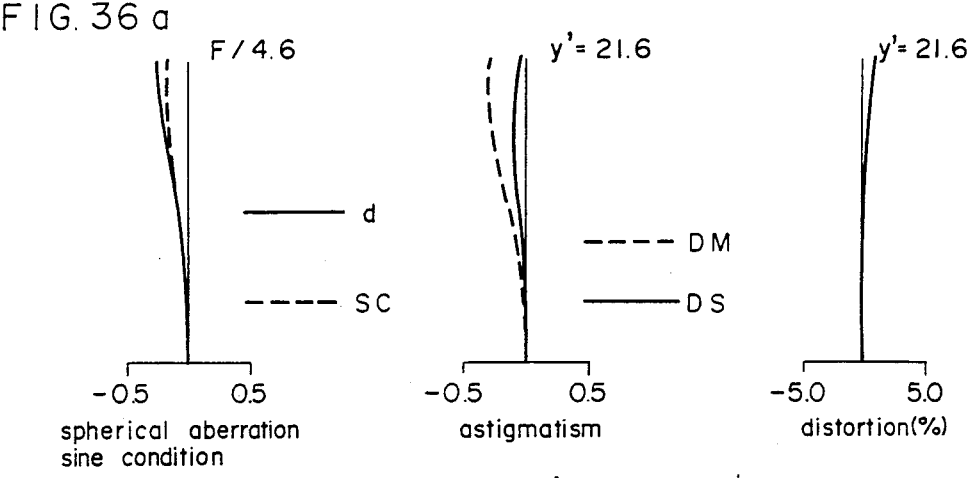
FIG. 36a, b and c represent graphs showing various aberrations of the embodiment 2 at the shortest, medium and longest focal length, respectively.
Figure 36B:
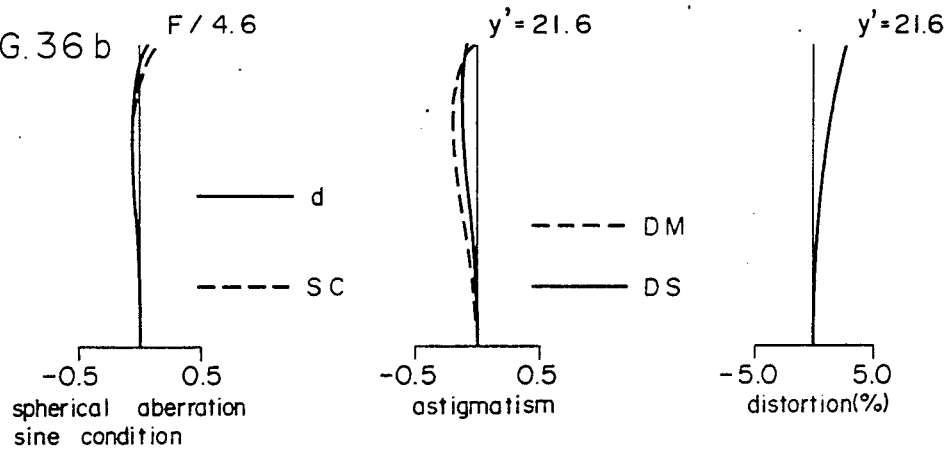
Figure 36C:
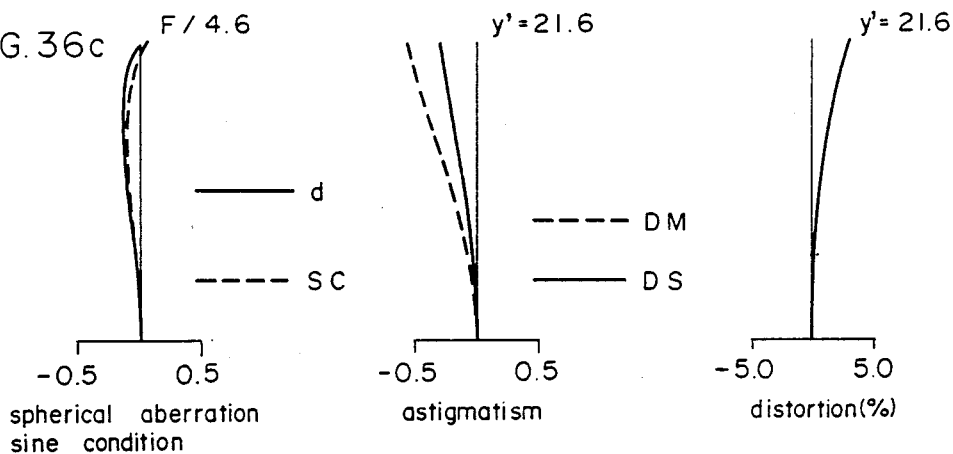
Figure 37A:
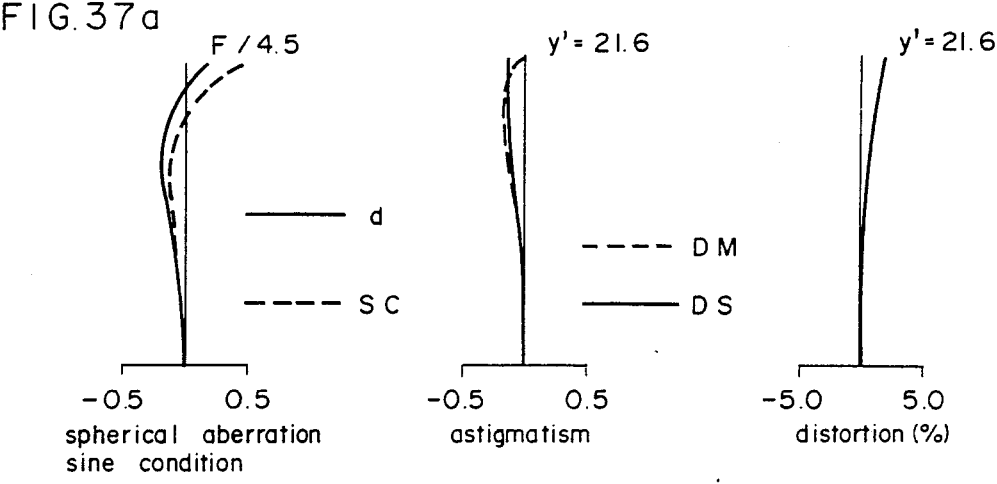
FIG. 37a, b, and c represent graphs showing various aberrations of the embodiment 3 at the shortest, medium, and longest focal length, respectively.
Figure 37B:
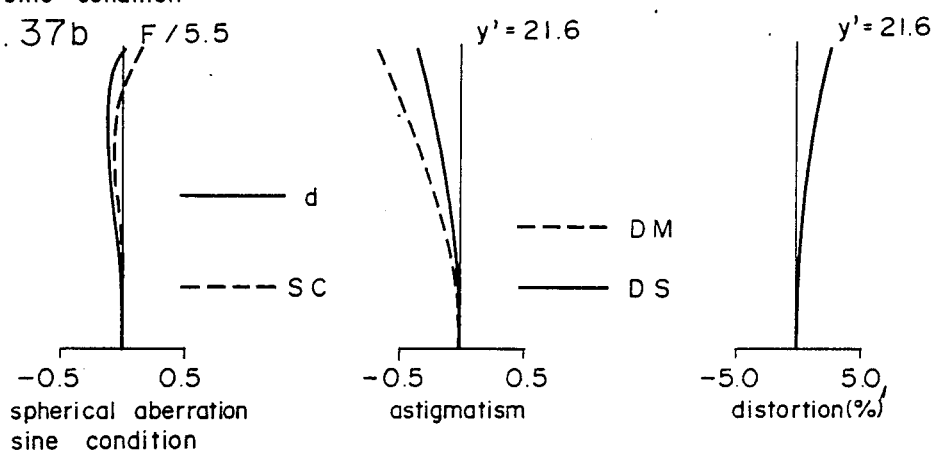
Figure 37C:
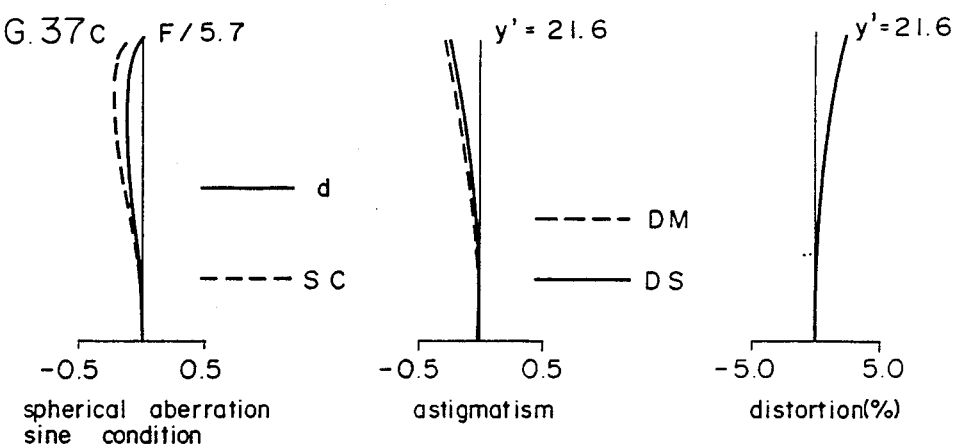
Figure 38A:
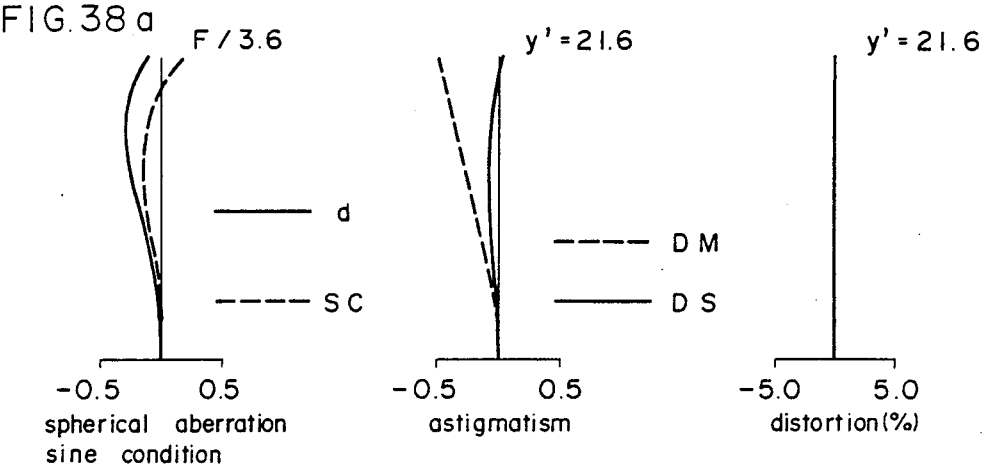
FIG. 38a, b and c represent graphs showing various aberrations of the embodiment 4 at the shortest, medium, and longest focal length, respectively.
Figure 38B:
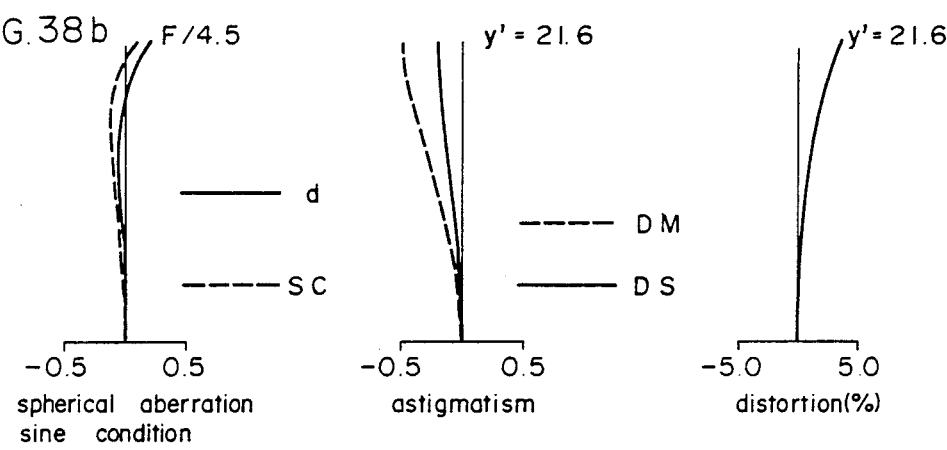
Figure 38C:
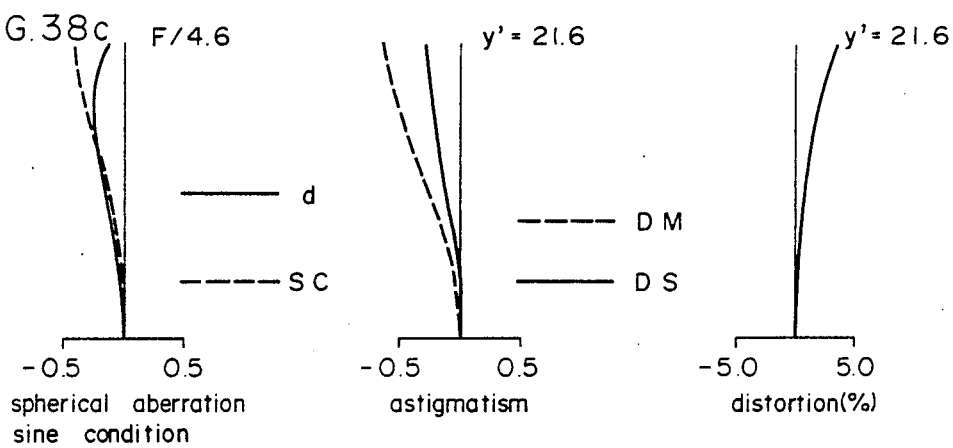
Figure 39A:
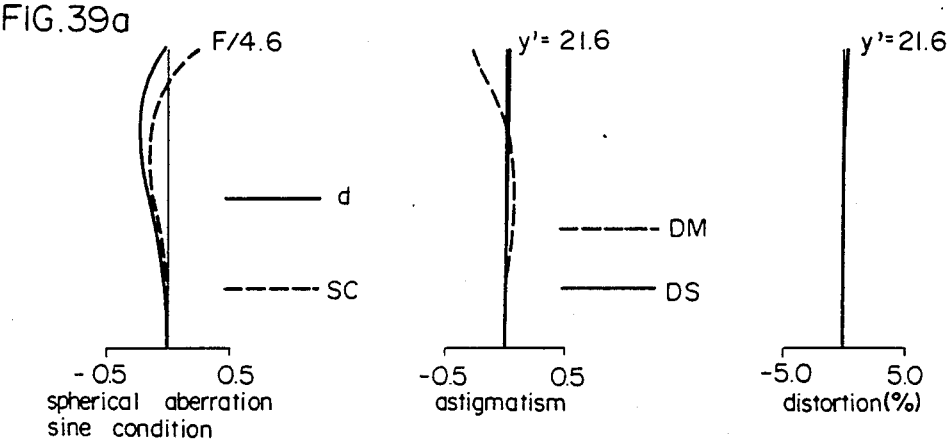
FIG. 39a, b and c represent graphs showing various aberrations of the embodiment 5 at the shortest, medium, and longest focal length, respectively.
Figure 39B:
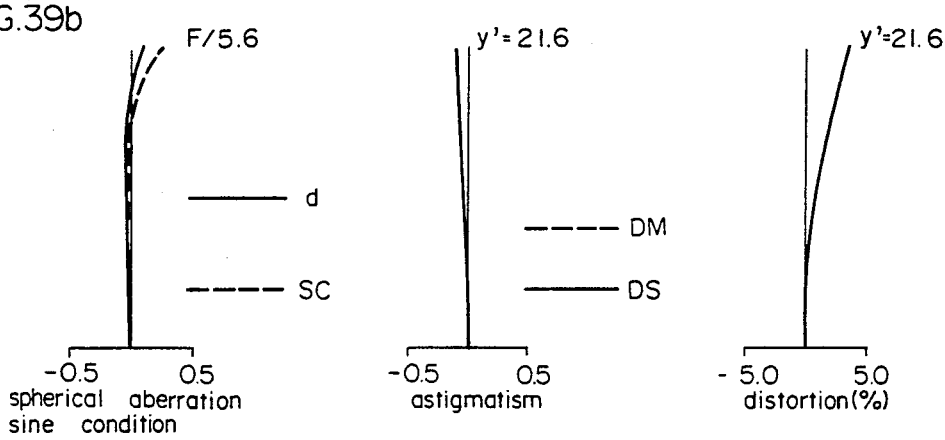
Figure 39C:
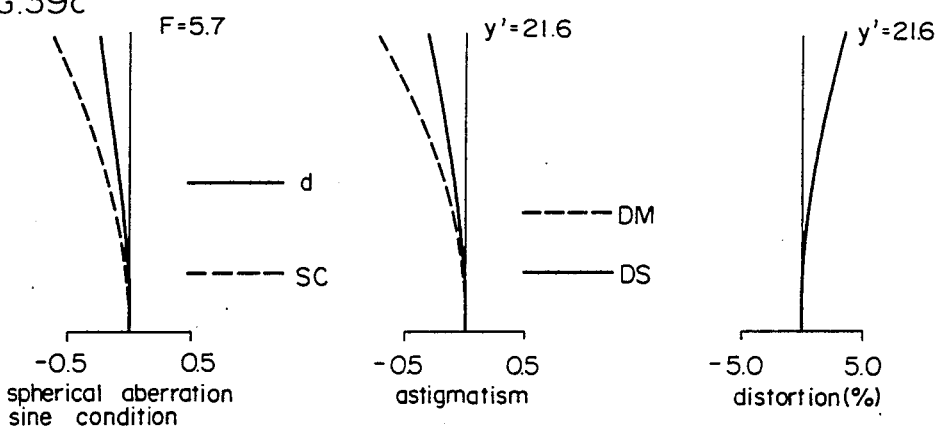
Figure 40A:
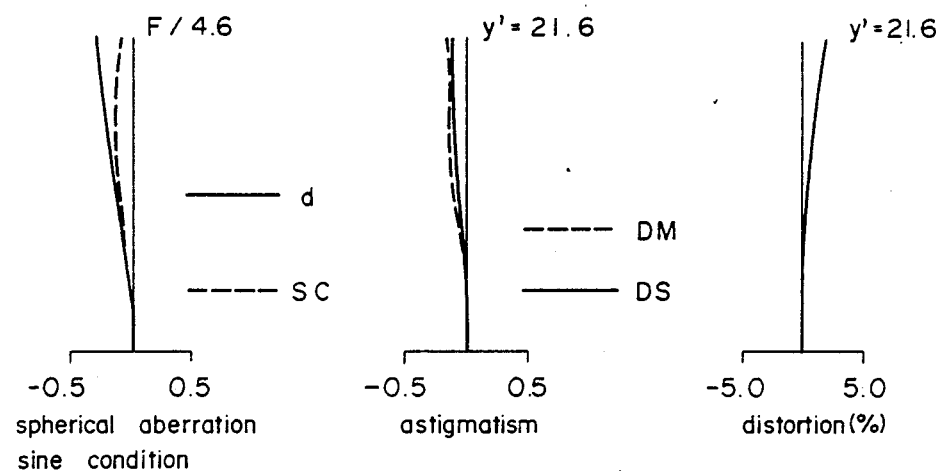
FIG. 40a, b and c represent graphs showing various aberrations of the embodiment 6 at the shortest, medium, and longest focal length, respectively.
Figure 40B:
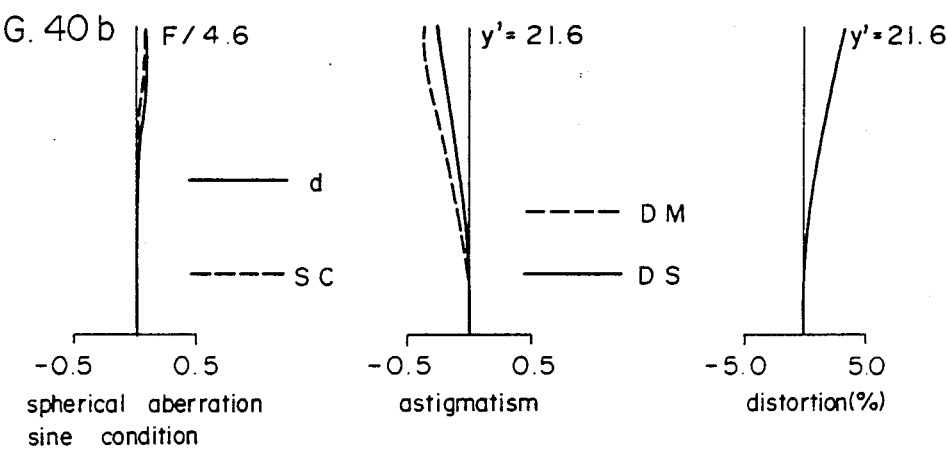
Figure 40C:
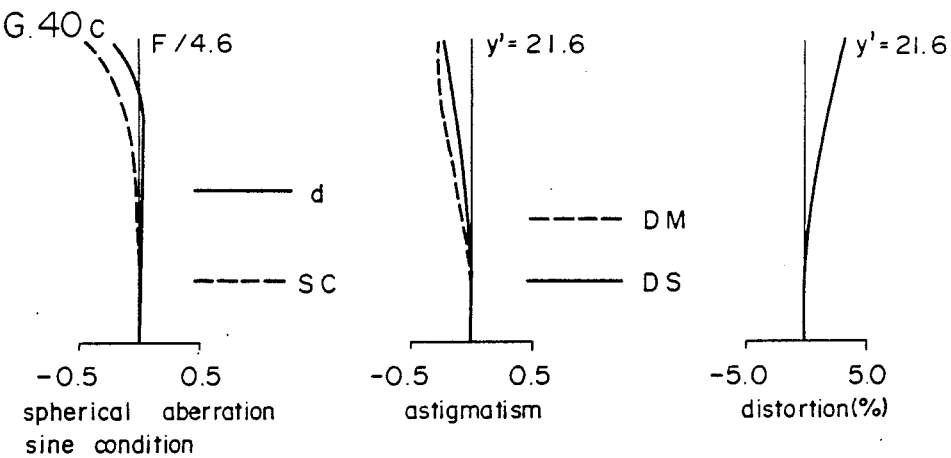
Figure 41A:
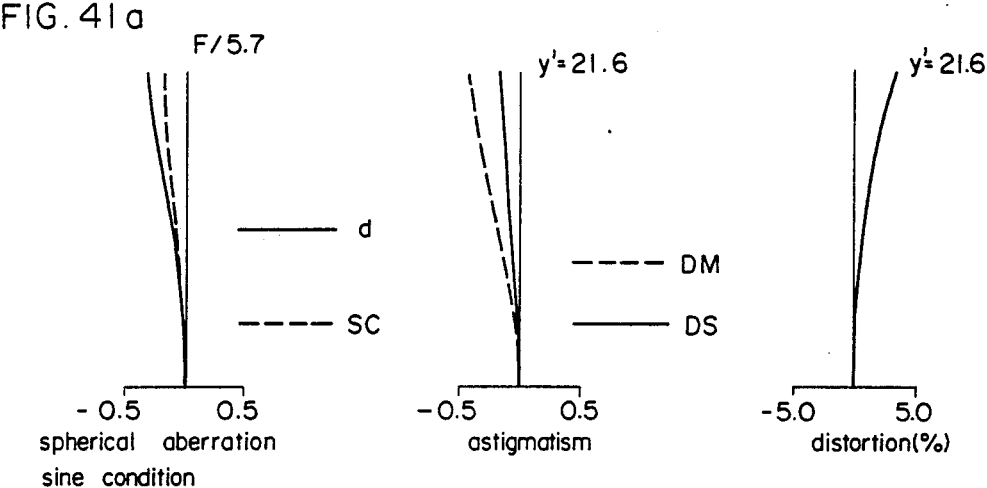
FIG. 41a, b and c represent graphs showing various aberrations of the embodiment 7 at the shortest, medium, and longest focal length, respectively.
Figure 41B:
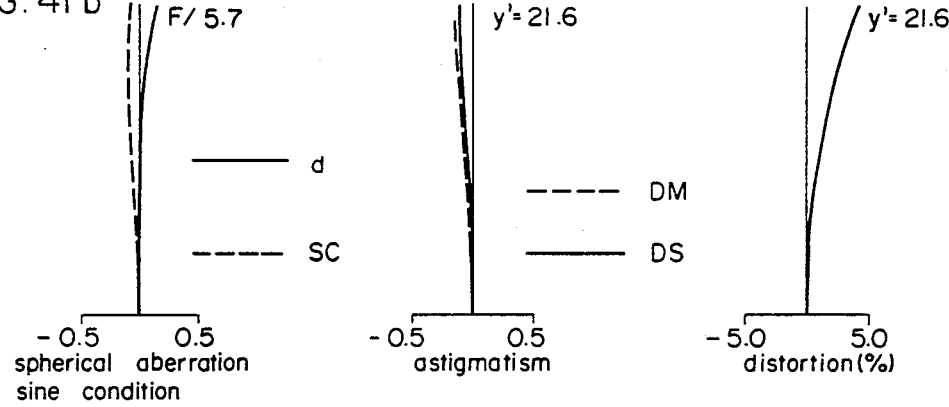
Figure 41C:
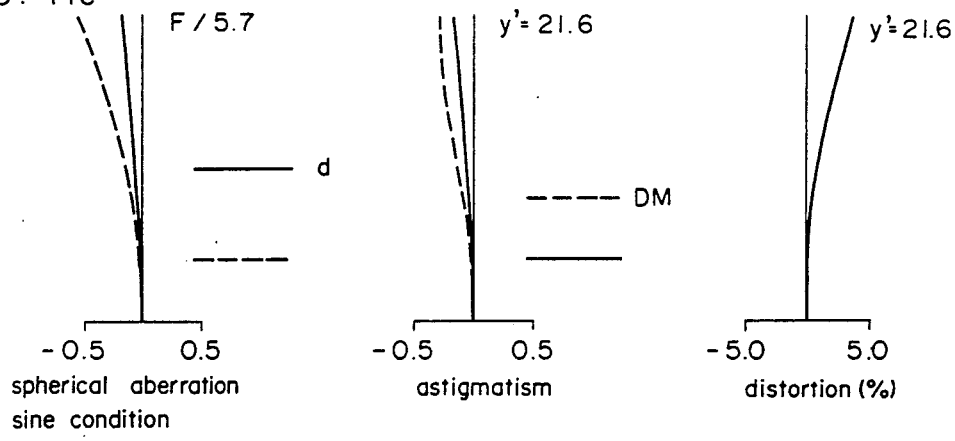
Figure 42A:
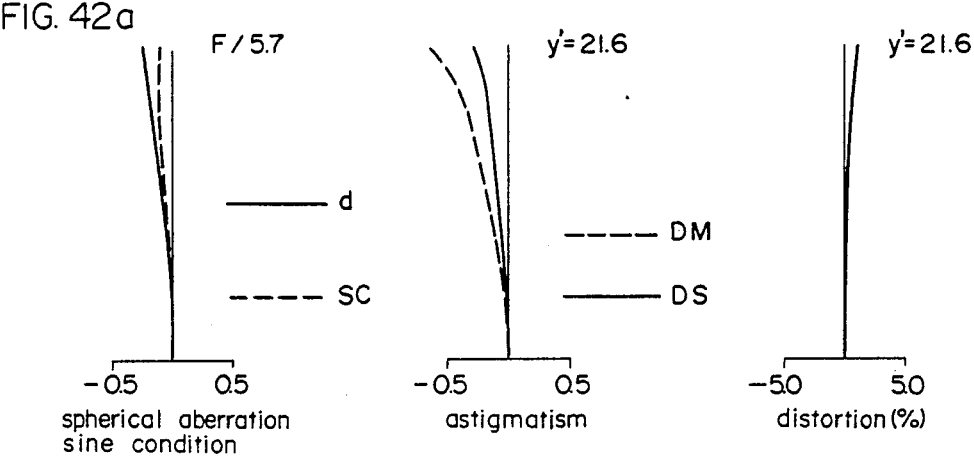
FIG. 42a, b and c represent graphs showing various aberrations of the embodiment 8 at the shortest, medium, and longest focal length, respectively.
Figure 42B:
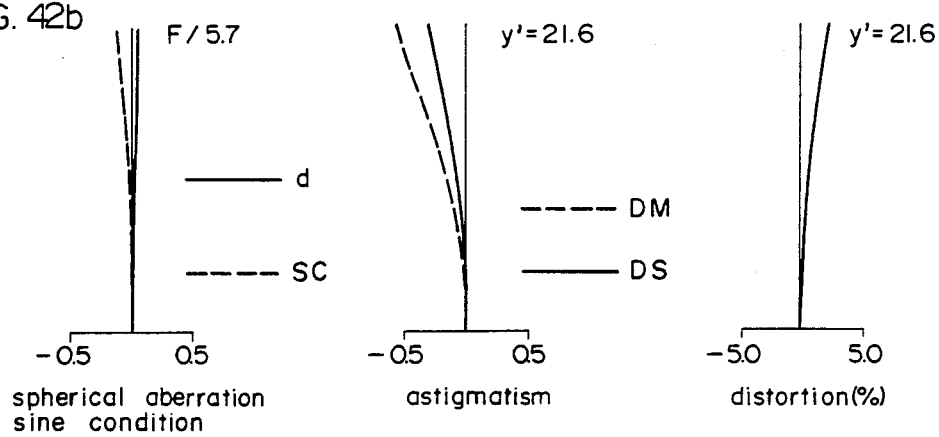
Figure 42C:
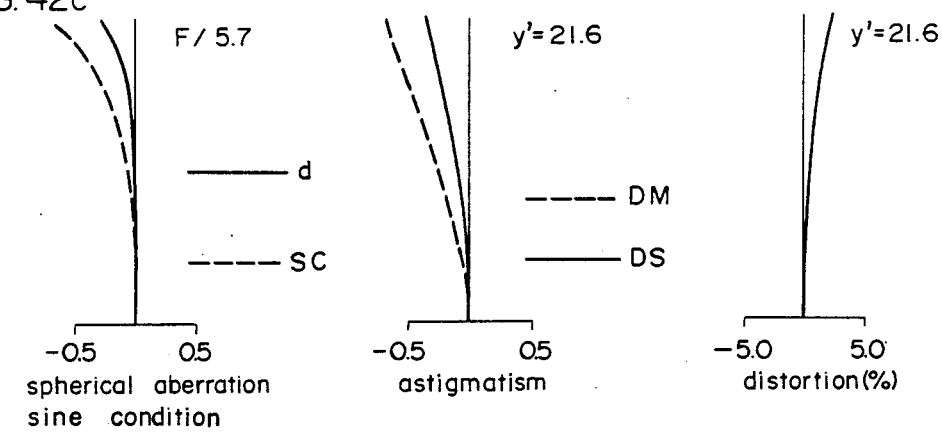
Figure 43A:
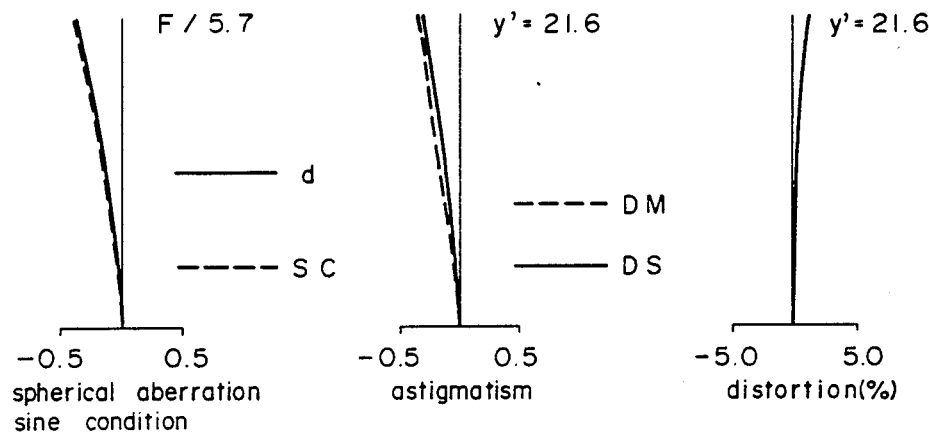
FIG. 43a, b and c represent graphs showing various aberrations of the embodiment 9 at the shortest, medium, and longest focal length, respectively.
Figure 43B:
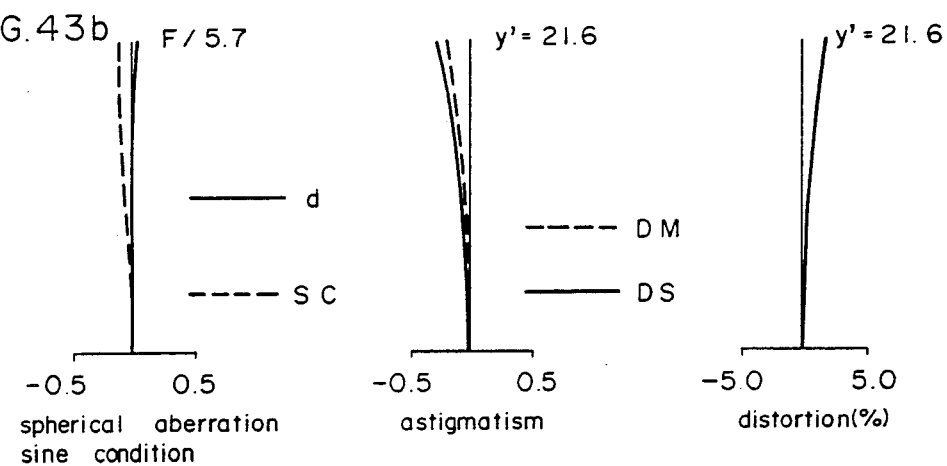
Figure 43C:
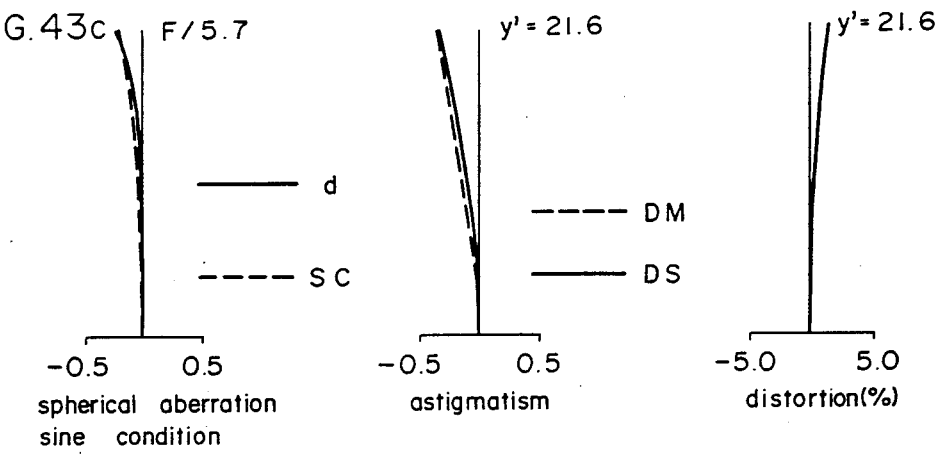
Figure 45A:
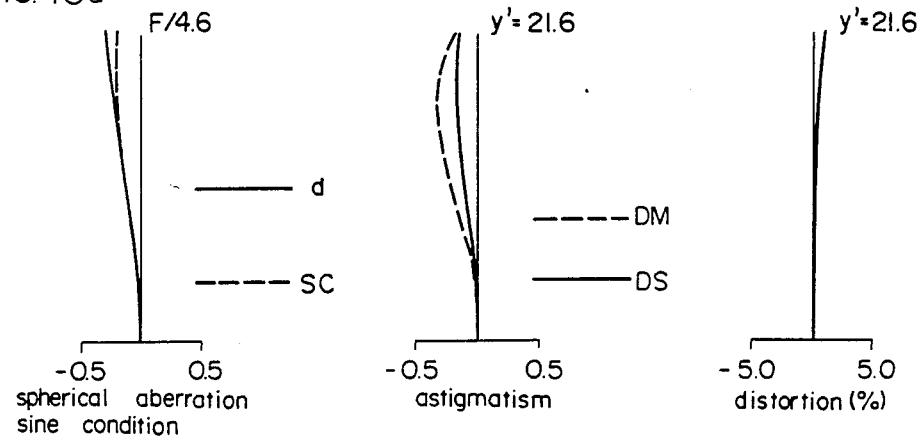
FIG. 45a, b and c represent graphs showing various aberrations of the embodiment 11 at the shortest, medium, and longest focal length, respectively.
Figure 45B:
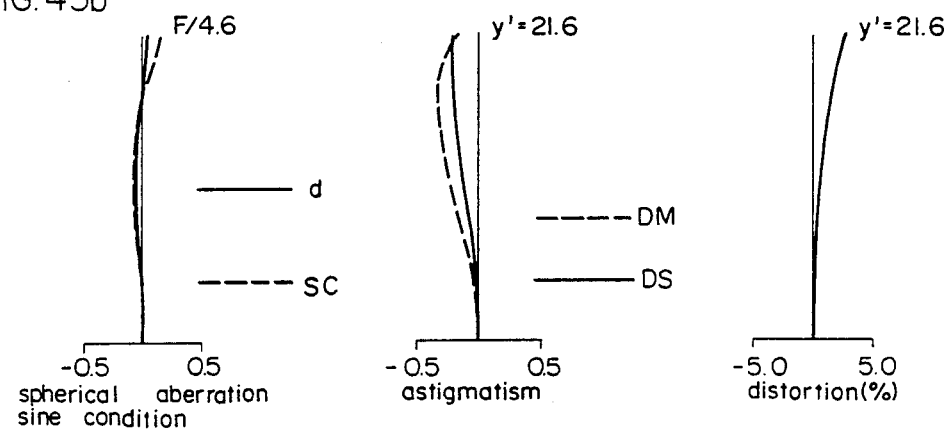
Figure 45C:
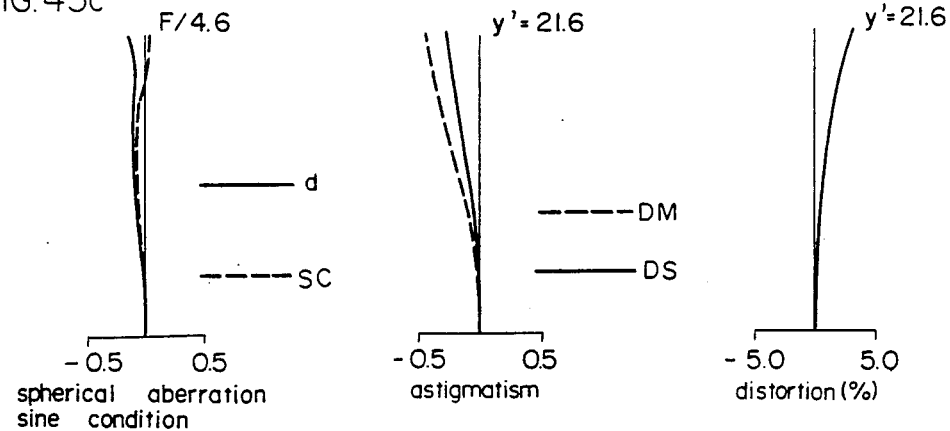
Figure 46A:
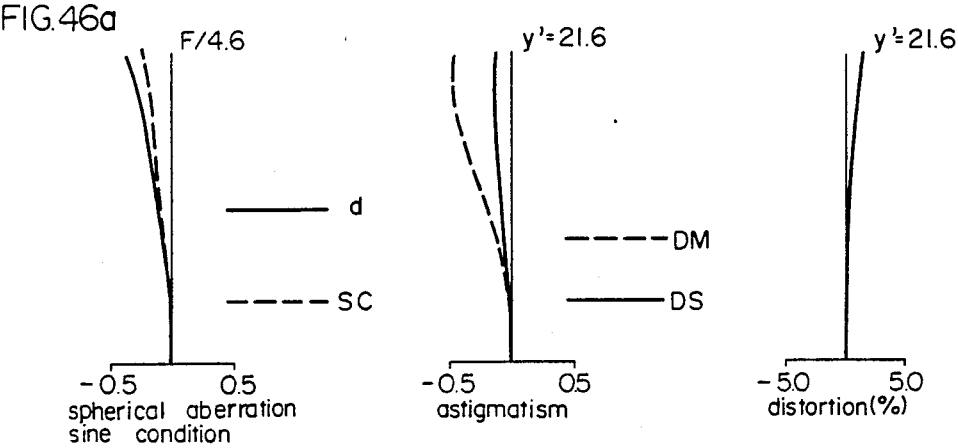
FIG. 46a, b and c represent graphs showing various aberrations of the embodiment 12 at the shortest, medium, and longest focal length, respectively.
Figure 46B:
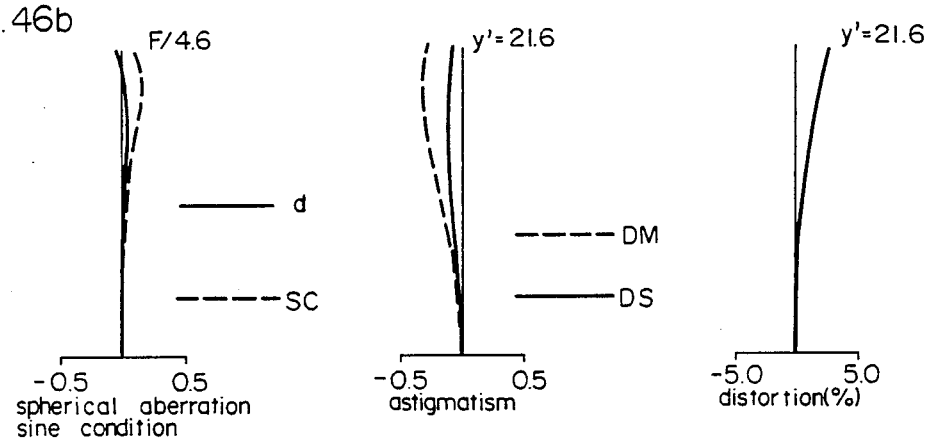
Figure 46C:
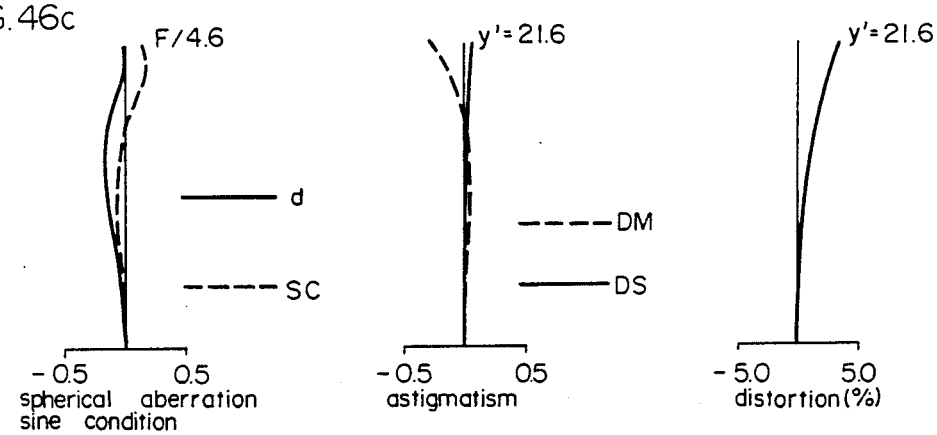
Figure 47A:
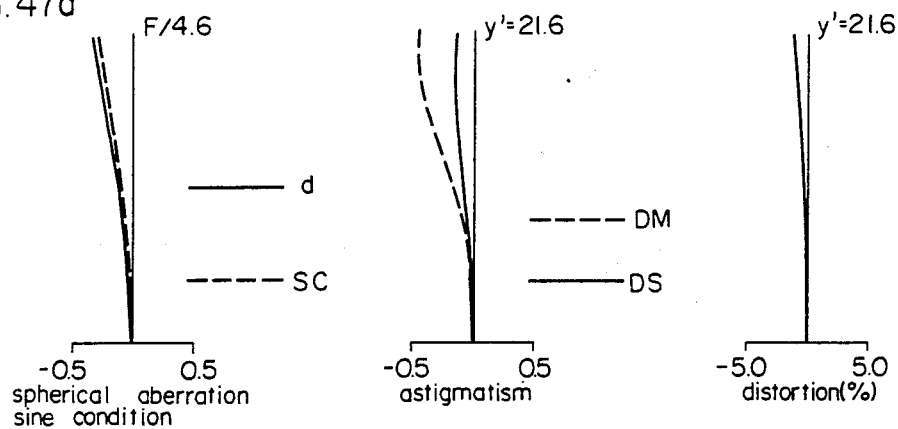
FIG. 47a, b and c represent graphs showing various aberrations of the embodiment 13 at the shortest, medium, and longest focal length, respectively.
Figure 47B:
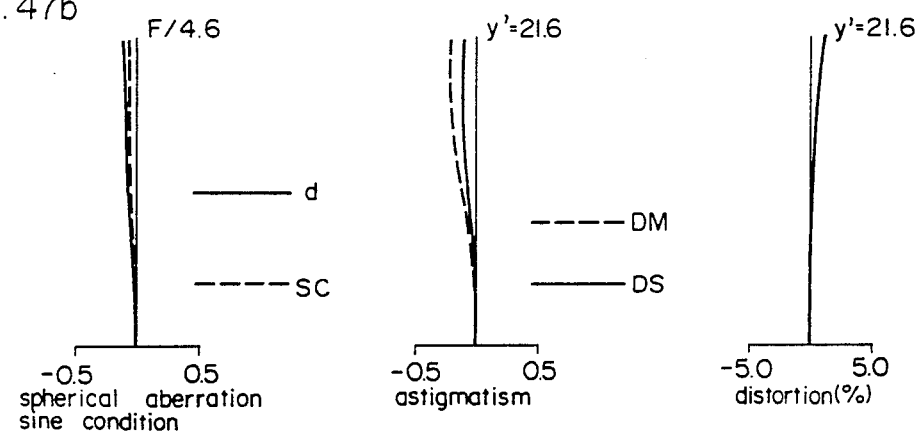
Figure 47C:
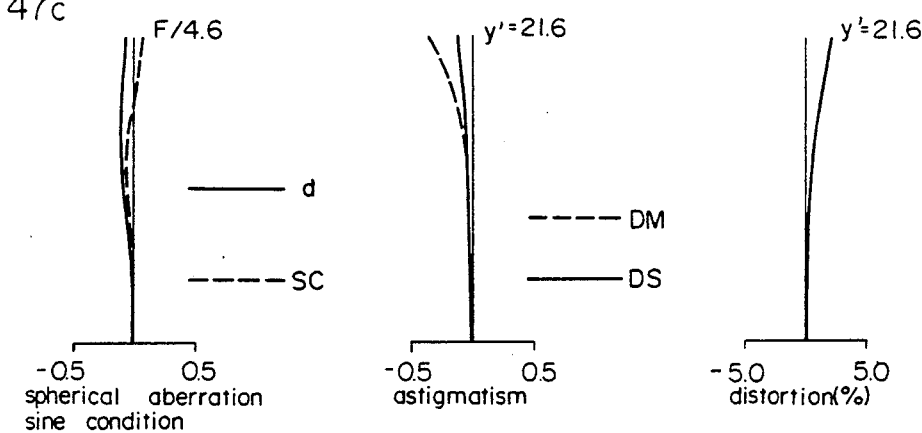
Figure 48A:
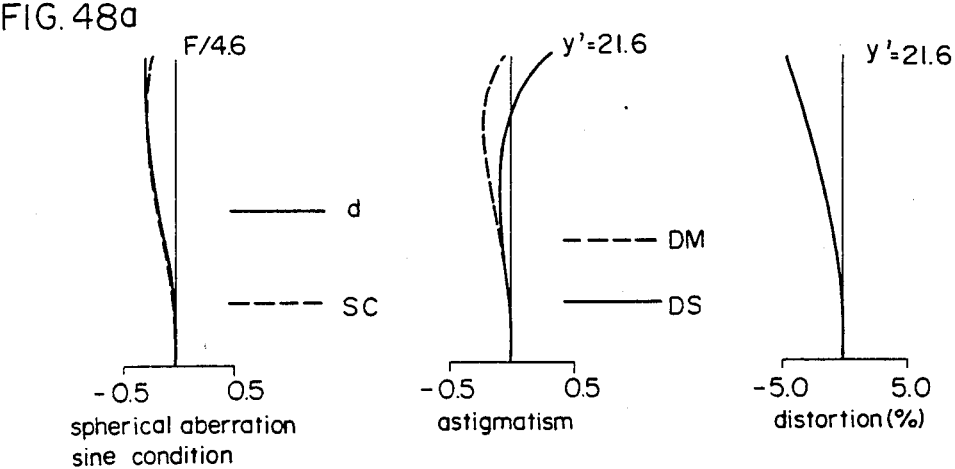
FIG. 48a, b and c represent graphs showing various aberrations of the embodiment 14 at the shortest, medium, and longest focal length, respectively.
Figure 48B:
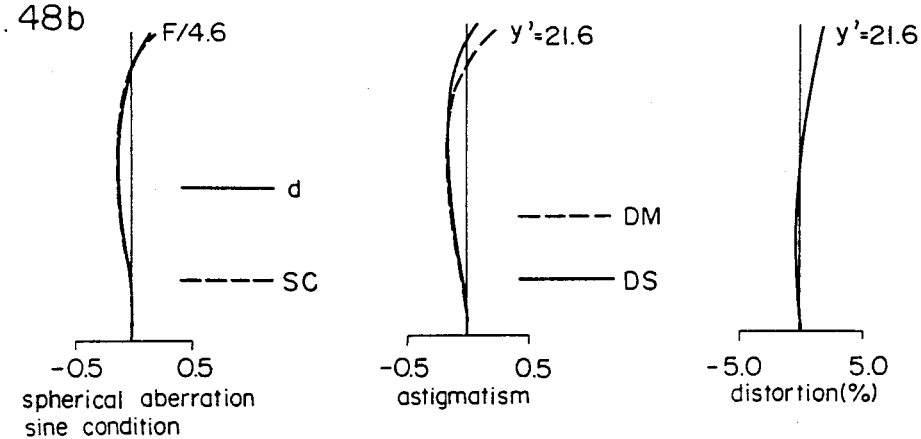
Figure 48C:
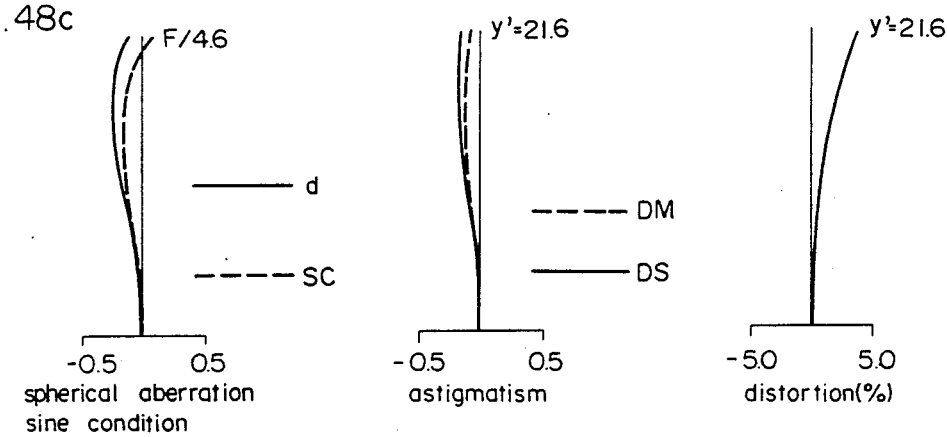
Figure 49A:
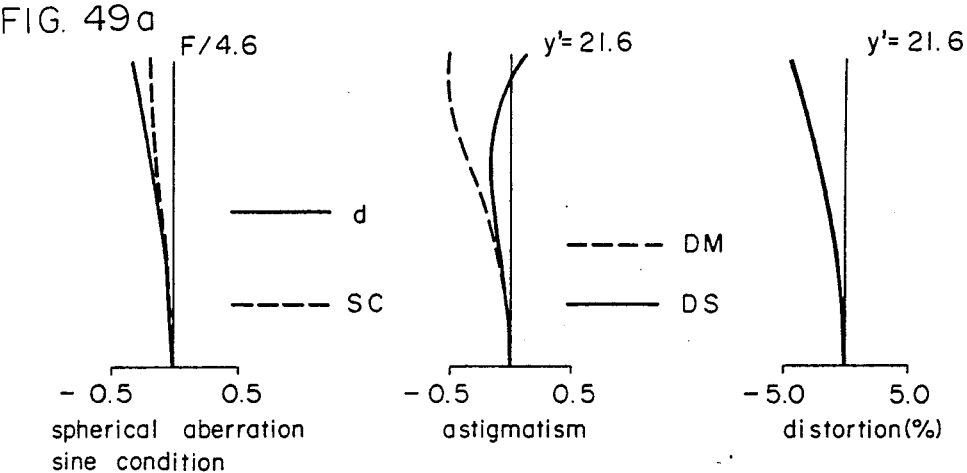
FIG. 49a, b and c represent graphs showing various aberrations of the embodiemnt 15 at the shortest, medium, and longest focal length, respectively.
Figure 49B:
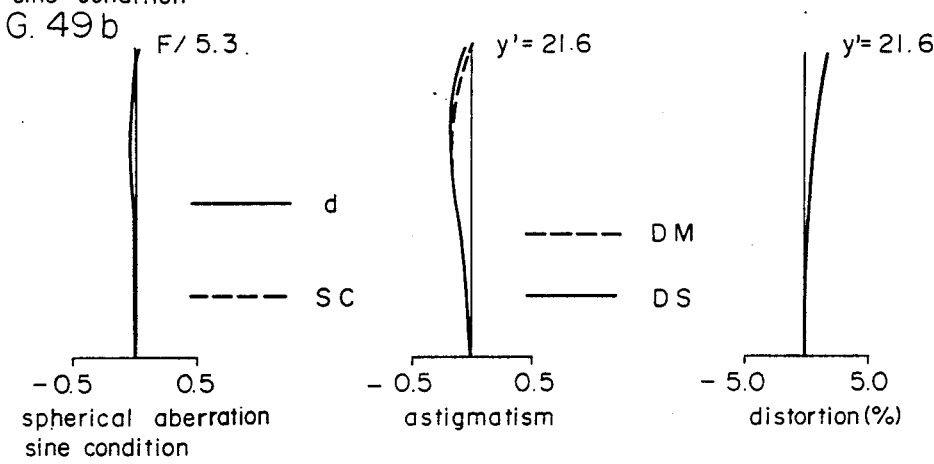
Figure 49C:
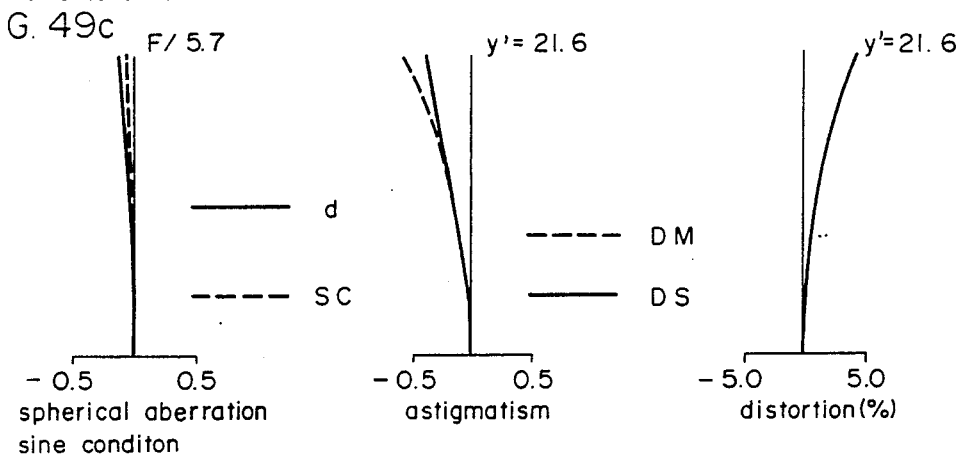
Figure 50A:
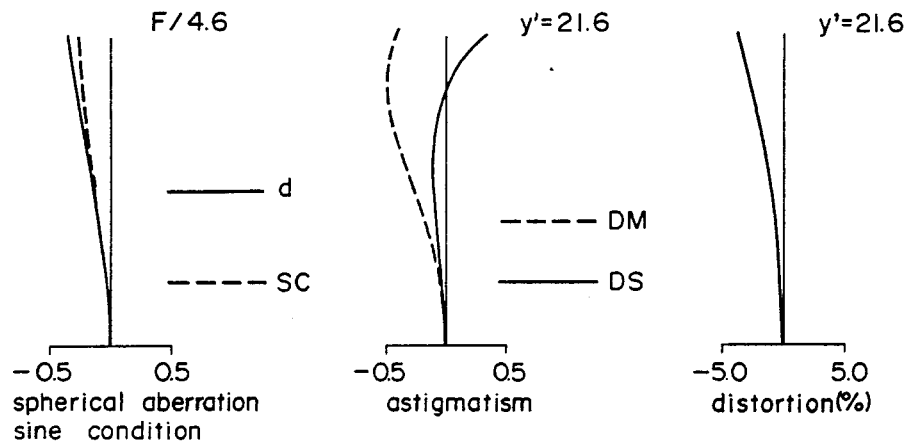
FIG. 50a, b and c represent graphs showing various aberrations of the embodiment 16 at the shortest, medium, and longest focal length, respectively.
Figure 50B:
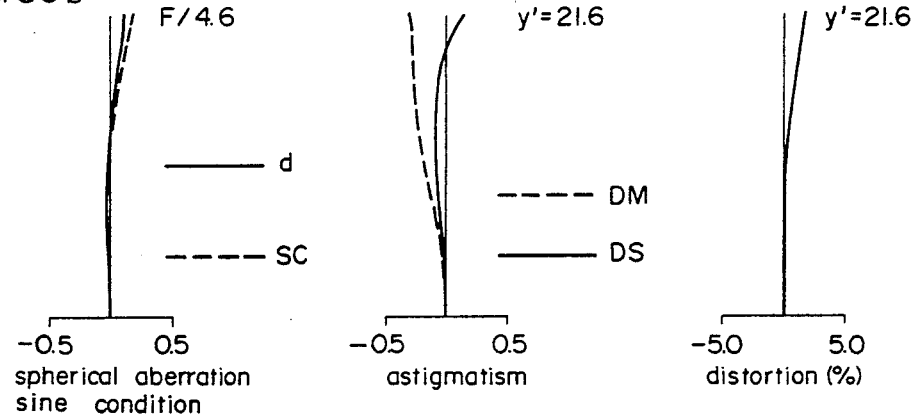
Figure 50C:
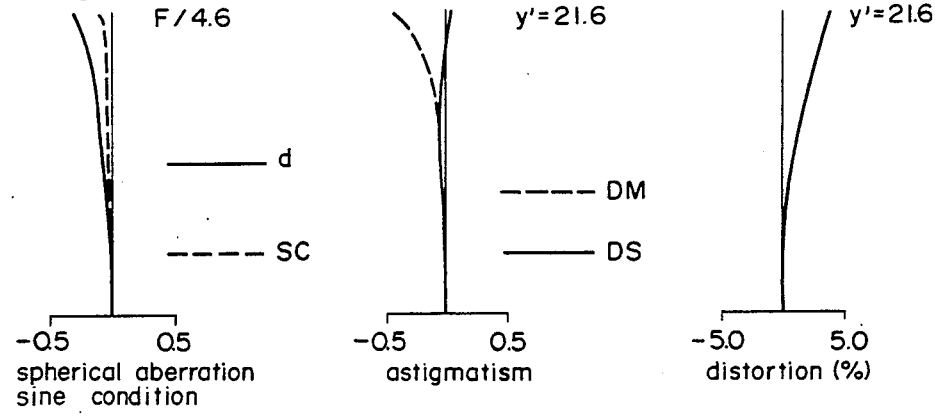
Figure 51A:
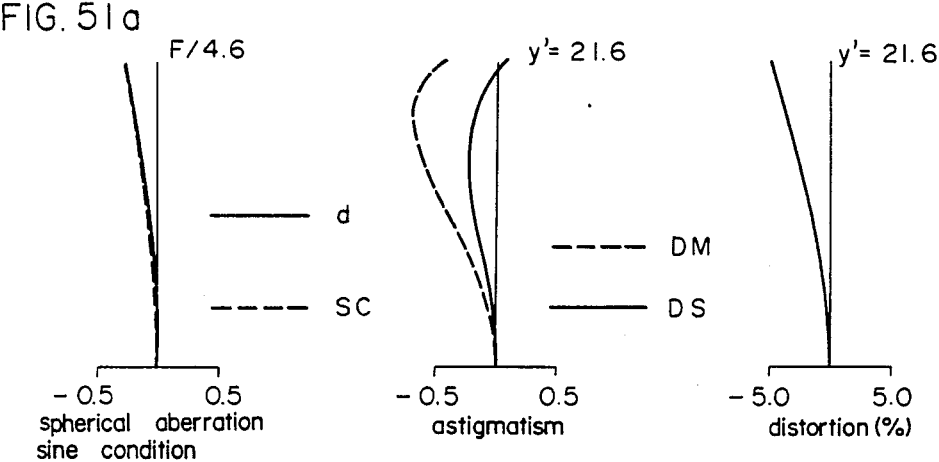
FIG. 51a, b and c represent graphs showing various aberrations of the embodiemnt 17 at the shortest, medium, and longest focal length, respectively.
Figure 51B:
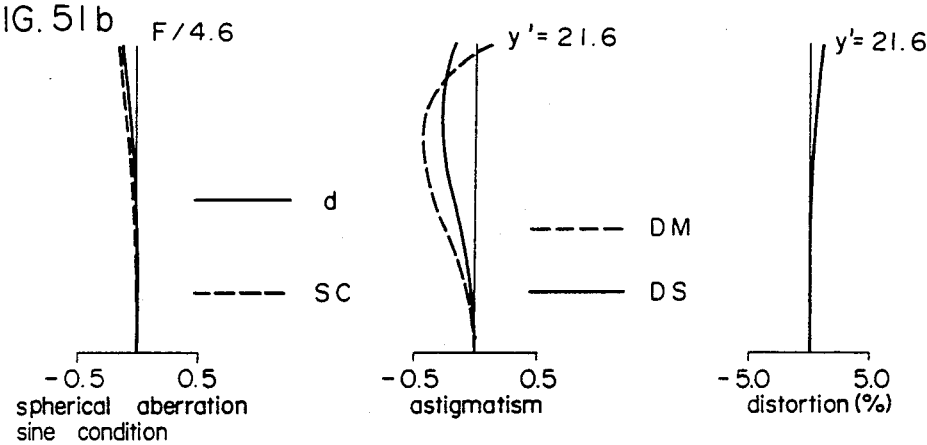
Figure 51C:
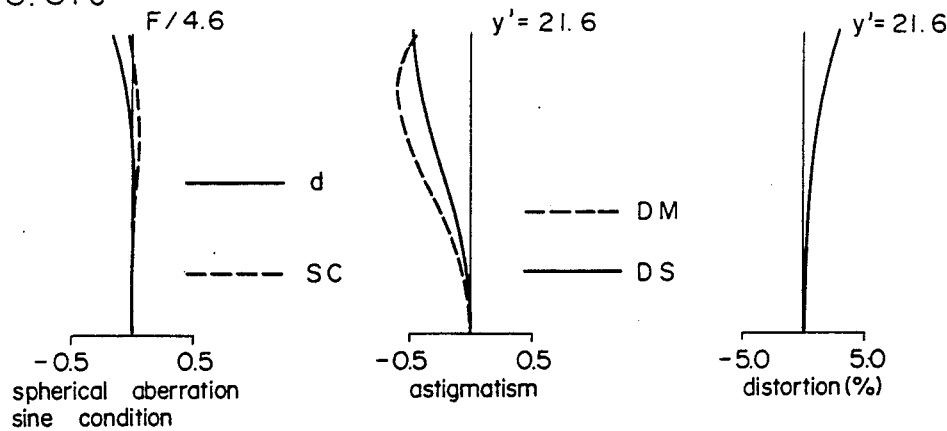

FIG. 15 represents the lens movement at the condition (A) to (E) shown in FIG. 14, respectively. It is noticed that the condition (B) and (D) are effective for making the lens barrel simple in construction since the second or third lens unit is fixed in a zooming operation. In the condition (B), the third lens unit is fixed since $\chi_3=0$. In the condition (D), the second lens unit is fixed since $\chi_2=0$.

The following Tables 2 to 18 disclose, respectively, the embodiments 1 to 17 of the present invention. In the Tables, f equals the focal length, r is the radius of curvature with respective sub numbers indicating the surfaces from the object to image side along the optical axis, d represents the axial distance and includes both the air spaces and the actual thickness of the lenses along the optical axis, N equals the refractive index and again, the sub numbers refer to the particular optical element from the object to image side, and finally, $\nu$ equals the Abbe number and the sub numbers refer to the specific lens elements from the object to image side.

TABLE 2

| Embodiment 1 | | | | | | | |
|---|---|---|---|---|---|---|---|
| | | f = 102.5 ~ 140.0 ~ 195.0 | | F.NO. = 4.5 | | | |
| | | radius of curvature | axial distance | | refractive index (Nd) | | Abbe number ($\nu$d) |
| I | r1 | 62.096 | | | | | |
| | | | d1 | 2.200 | N1 | 1.80518 | $\nu$1 25.43 |
| | r2 | 44.325 | | | | | |
| | | | d2 | 1.300 | | | |
| | r3 | 46.360 | | | | | |
| | | | d3 | 6.100 | N2 | 1.62041 | $\nu$2 60.29 |
| | r4 | 798.824 | | | | | |
| | | | d4 | 3.500 ~ 32.040 ~ 65.701 | | | |
| II | r5 | −85.141 | | | | | |
| | | | d5 | 1.500 | N3 | 1.71300 | $\nu$3 53.93 |
| | r6 | 88.239 | | | | | |
| | | | d6 | 2.000 | N4 | 1.80518 | $\nu$4 25.43 |
| | r7 | 617.791 | | | | | |
| | | | d7 | 38.069 ~ 21.304 ~ 5.000 | | | |
| III | r8 | 55.510 | | | | | |
| | | | d8 | 1.600 | N5 | 1.84666 | $\nu$5 23.83 |
| | r9 | 28.939 | | | | | |
| | | | d9 | 1.100 | | | |
| | r10 | 32.136 | | | | | |
| | | | d10 | 4.500 | N6 | 1.72000 | $\nu$6 52.14 |
| | r11 | −82.898 | | | | | |
| | | | d11 | 31.132 ~ 19.357 ~ 2.000 | | | |
| IV | r12 | 220.759 | | | | | |
| | | | d12 | 4.000 | N7 | 1.67339 | $\nu$7 29.25 |
| | r13 | −30.975 | | | | | |
| | | | d13 | 1.500 | N8 | 1.74400 | $\nu$8 44.93 |
| | r14 | 41.862 | | | | | |
| | | | $\Sigma$ = 98.501 ~ 98.501 ~ 98.501 | | | | |

TABLE 3

Embodiment 2 f = 76.5~100.0~147.0  F.NO. = 4.5

| | | radius of curvature | | axial distance | refractive index (Nd) | | Abbe number (νd) | |
|---|---|---|---|---|---|---|---|---|
| I | r1 | 56.744 | d1 | 1.800 | N1 1.80518 | ν1 | 25.43 | |
| | r2 | 39.075 | d2 | 1.000 | | | | |
| | r3 | 40.214 | d3 | 4.500 | N2 1.69680 | ν2 | 56.47 | |
| | r4 | 408.048 | d4 | 4.500~16.948~37.935 | | | | |
| II | r5 | −47.181 | d5 | 1.400 | N3 1.51680 | ν3 | 64.12 | |
| | r6 | 47.901 | d6 | 0.719 | | | | |
| | r7 | 57.197 | d7 | 2.200 | N4 1.80518 | ν4 | 25.43 | |
| | r8 | 165.966 | d8 | 21.304~14.172~2.000 | | | | |
| III | r9 | 71.878 | d9 | 1.200 | N5 1.84666 | ν5 | 23.88 | |
| | r10 | 28.332 | d10 | 0.600 | | | | |
| | r11 | 29.805 | d11 | 4.800 | N6 1.62299 | ν6 | 58.06 | |
| | r12 | −47.329 | d12 | 0.120 | | | | |
| | r13 | 58.561 | d13 | 3.000 | N7 1.62041 | ν7 | 60.29 | |
| | r14 | −6894.643 | d14 | 15.631~10.315~1.500 | | | | |
| IV | r15 | −122.813 | d15 | 3.300 | N8 1.75520 | ν8 | 27.51 | |
| | r16 | −27.557 | d16 | 1.800 | N9 1.68900 | ν9 | 49.43 | |
| | r17 | 37.534 | | | | | | |

Σd = 67.874~67.874~67.874

TABLE 4

Embodiment 3 f = 137.0~200.0~293.0  F.NO. = 4.5 5.6

| | | radius of curvature | | axial distance | refractive index (Nd) | | Abbe number (νd) |
|---|---|---|---|---|---|---|---|
| I | r1 | 113.154 | d1 | 2.000 | N1 1.80518 | ν1 | 25.43 |
| | r2 | 77.073 | d2 | 6.500 | N2 1.51680 | ν2 | 64.12 |
| | r3 | 605.491 | d3 | 0.200 | | | |
| | r4 | 116.647 | d4 | 3.500 | N3 1.51680 | ν3 | 64.12 |
| | r5 | 553.161 | d5 | 5.000~47.795~94.621 | | | |
| II | r6 | −73.448 | d6 | 1.600 | N4 1.72000 | ν4 | 54.71 |
| | r7 | 285.913 | d7 | 1.500 | | | |
| | r8 | −1911.460 | d8 | 2.876 | N5 1.80518 | ν5 | 25.43 |
| | r9 | −124.513 | d9 | 40.850~20.887~3.677 | | | |
| III | r10 | 99.415 | d10 | 1.300 | N6 1.75690 | ν6 | 29.69 |
| | r11 | 33.631 | d11 | 1.321 | | | |
| | r12 | 35.839 | d12 | 6.500 | N7 1.61765 | ν7 | 55.15 |
| | r13 | −69.049 | d13 | 53.448~30.617~1.000 | | | |
| IV | r14 | 444.507 | d14 | 4.467 | N8 1.75450 | ν8 | 32.83 |
| | r15 | −27.320 | d15 | 1.686 | N9 1.78100 | ν9 | 44.55 |
| | r16 | 55.525 | | | | | |

Σd = 132.747~132.747~132.747

TABLE 5

Embodiment 4 f = 82.5 ~ 140.0 ~ 195.0    F.NO. = 3.5 ~ 4.5

| | | radius of curvature | | axial distance | refractive index (Nd) | | Abbe number (νd) | |
|---|---|---|---|---|---|---|---|---|
| I | r1 | 75.891 | d1 | 2.000 | N1 1.80518 | ν1 | 25.43 | |
| | r2 | 50.677 | d2 | 1.049 | | | | |
| | r3 | 54.549 | d3 | 6.500 | N2 1.69680 | ν2 | 56.47 | |
| | r4 | −3361.570 | d4 | 3.500 ~ 34.453 ~ 58.497 | | | | |
| II | r5 | −67.627 | d5 | 1.500 | N3 1.61800 | ν3 | 63.45 | |
| | r6 | 80.318 | d6 | 0.714 | | | | |
| | r7 | 109.461 | d7 | 2.500 | N4 1.80518 | ν4 | 25.43 | |
| | r8 | 23781.200 | d8 | 41.483 ~ 19.757 ~ 3.500 | | | | |
| III | r9 | 79.463 | d9 | 1.300 | N5 1.84666 | ν5 | 23.88 | |
| | r10 | 32.734 | d10 | 1.311 | | | | |
| | r11 | 38.620 | d11 | 4.000 | N6 1.58913 | ν6 | 61.11 | |
| | r12 | −99.087 | d12 | 0.150 | | | | |
| | r13 | 43.225 | d13 | 3.500 | N7 1.51680 | ν7 | 64.12 | |
| | r14 | −81.389 | d14 | 18.614 ~ 9.386 ~ 1.600 | | | | |
| IV | r15 | −118.662 | d15 | 3.500 | N8 1.80518 | ν8 | 25.43 | |
| | r16 | −28.002 | d16 | 1.800 | N9 1.67003 | ν9 | 47.15 | |
| | r17 | 30.748 | Σd = 93.421 ~ 93.421 ~ 93.421 | | | | | |

TABLE 6

Embodiment 5 f = 102.0 ~ 200.0 ~ 293.0    F.NO. = 4.5 ~ 5.6

| | | radius of curvature | | axial distance | refractive index (Nd) | | Abbe number (νd) | |
|---|---|---|---|---|---|---|---|---|
| I | r1 | 186.245 | d1 | 2.000 | N1 1.80518 | ν1 | 25.43 | |
| | r2 | 104.061 | d2 | 6.500 | N2 1.51680 | ν2 | 64.12 | |
| | r3 | −609.306 | d3 | 0.200 | | | | |
| | r4 | 99.231 | d4 | 4.500 | N3 1.51680 | ν3 | 64.12 | |
| | r5 | 525.660 | d5 | 5.000 ~ 63.183 ~ 93.629 | | | | |
| II | r6 | −48.004 | d6 | 1.500 | N4 1.72000 | ν4 | 50.31 | |
| | r7 | −378.288 | d7 | 1.406 | | | | |
| | r8 | −46.735 | d8 | 1.600 | N5 1.7130 | ν5 | 53.93 | |
| | r9 | 58.990 | d9 | 5.000 | N6 1.66998 | ν6 | 39.23 | |
| | r10 | −37.436 | d10 | 41.464 ~ 11.093 ~ 3.677 | | | | |
| III | r11 | −237.577 | d11 | 1.300 | N7 1.71736 | ν7 | 29.42 | |
| | r12 | 48.198 | d12 | 1.365 | | | | |
| | r13 | 135.578 | d13 | 3.372 | N8 1.51823 | ν8 | 58.96 | |
| | r14 | −74.473 | d14 | 0.500 | | | | |
| | r15 | 44.907 | d15 | 5.270 | N9 1.51823 | ν9 | 58.96 | |
| | r16 | −57.244 | d16 | 52.043 ~ 24.231 ~ 1.000 | | | | |
| IV | r17 | 147.678 | d17 | 2.963 | N10 1.73300 | ν10 | 28.24 | |
| | r18 | −88.333 | | | | | | |

TABLE 6-continued

Embodiment 5
$f = 102.0 \sim 200.0 \sim 293.0$    $F_{NO} = 4.5 \sim 5.6$

| radius of curvature | axial distance | refractive index (Nd) | Abbe number (νd) |
|---|---|---|---|
| | d18 1.681 | N11 1.77250 ν11 | 49.77 |
| r19 40.612 | | | |
| | $\Sigma d = 137.664 \sim 137.664 \sim 137.664$ | | |

TABLE 7

Embodiment 6
$f = 102.0 \sim 150.0 \sim 195.0$    $F_{NO} = 4.6$

| radius of curvature | axial distance | refractive index (Nd) | Abbe number (νd) |
|---|---|---|---|
| r1 78.801 | | | |
| | d1 2.000 | N1 1.84666 ν1 | 23.88 |
| r2 54.645 | | | |
| | d2 1.000 | | |
| r3 54.738 | | | |
| | d3 5.000 | N2 1.61800 ν2 | 63.45 |
| r4 564.477 | | | |
| | d4 0.200 | | |
| r5 60.158 | | | |
| | d5 2.500 | N3 1.61800 ν3 | 63.45 |
| r6 82.984 | | | |
| | d6 3.000~34.772~59.078 | | |
| r7 −75.163 | | | |
| | d7 1.500 | N4 1.61720 ν4 | 54.00 |
| r8 66.699 | | | |
| | d8 0.624 | | |
| r9 82.014 | | | |
| | d9 2.000 | N5 1.80518 ν5 | 25.43 |
| r10 376.944 | | | |
| | d10 33.889~14.990~3.500 | | |
| r11 −8042.456 | | | |
| | d11 2.200 | N6 1.60311 ν6 | 60.74 |
| r12 −102.911 | | | |
| | d12 0.150 | | |
| r13 69.355 | | | |
| | d13 4.200 | N7 1.51680 ν7 | 64.12 |
| r14 −29.947 | | | |
| | d14 0.500 | | |
| r15 −29.148 | | | |
| | d15 1.100 | N8 1.80518 ν8 | 25.43 |
| r16 −49.778 | | | |
| | d16 27.239~13.816~1.000 | | |
| r17 −175.427 | | | |
| | d17 3.104 | N9 1.70055 ν9 | 27.58 |
| r18 −32.925 | | | |
| | d18 0.689 | | |
| r19 −30.754 | | | |
| | d19 1.800 | N10 1.75450 ν10 | 51.57 |
| r20 53.683 | | | |
| | $\Sigma d = 92.145 \sim 92.145 \sim 92.145$ | | |

TABLE 8

Embodiment 7
$f = 102.0 \sim 150.0 \sim 195.0$    $F_{NO} = 5.7$

| radius of curvature | axial distance | refractive index (Nd) | Abbe number (νd) |
|---|---|---|---|
| r1 58.312 | | | |
| | d1 2.000 | N1 1.84666 ν1 | 23.88 |
| r2 41.648 | | | |
| | d2 4.000 | N2 1.61800 ν2 | 63.45 |
| r3 358.341 | | | |
| | d3 0.150 | | |
| r4 53.394 | | | |
| | d4 2.500 | N3 1.51680 ν3 | 64.12 |
| r5 71.383 | | | |
| | d5 2.500~28.451~48.024 | | |
| r6 −65.392 | | | |
| | d6 1.500 | N4 1.69680 ν4 | 56.47 |
| r7 58.163 | | | |
| | d7 0.432 | | |
| r8 55.616 | | | |
| | d8 2.500 | N5 1.75000 ν5 | 25.14 |
| r9 165.908 | | | |
| | d9 23.818~10.887~4.000 | | |
| r10 323.180 | | | |
| | d10 2.000 | N6 1.51680 ν6 | 64.12 |
| r11 −53.138 | | | |
| | d11 0.150 | | |
| r12 71.196 | | | |
| | d12 3.000 | N7 1.51680 ν7 | 64.12 |
| r13 −33.634 | | | |
| | d13 1.100 | N8 1.80518 ν8 | 25.43 |
| r14 −69.513 | | | |
| | d14 27.705~14.685~2.000 | | |
| r15 −154.652 | | | |
| | d15 2.835 | N9 1.75000 ν9 | 25.14 |
| r16 −32.059 | | | |
| | d16 0.883 | | |
| r17 −28.858 | | | |
| | d17 1.800 | N10 1.77250 ν10 | 49.77 |
| r18 47.672 | | | |
| | $\Sigma d = 78.874 \sim 78.874 \sim 78.874$ | | |

TABLE 9

Embodiment 8
$f = 102.0 \sim 150.0 \sim 195.0$    $F_{NO} = 5.7$

| radius of curvature | axial distance | refractive index (Nd) | Abbe number (νd) |
|---|---|---|---|
| r1 82.373 | | | |
| | d1 2.000 | N1 1.84666 ν1 | 23.88 |
| r2 58.973 | | | |
| | d2 3.500 | N2 1.61800 ν2 | 63.45 |
| r3 488.563 | | | |
| | d3 0.150 | | |
| r4 55.294 | | | |
| | d4 2.500 | N3 1.61800 ν3 | 63.45 |
| r5 66.038 | | | |
| | d5 2.500~36.594~60.512 | | |
| r6 −73.867 | | | |
| | d6 1.500 | N4 1.62041 ν4 | 60.29 |
| r7 55.236 | | | |
| | d7 0.436 | | |
| r8 54.613 | | | |
| | d8 2.500 | N5 1.80518 ν5 | 25.43 |
| r9 124.396 | | | |
| | d9 24.000~9.500~4.000 | | |

TABLE 9-continued

Embodiment 8
$f = 102.0 \sim 150.0 \sim 195.0$  $F_{NO} = 5.7$

| radius of curvature | axial distance | refractive index (Nd) | Abbe number (νd) |
|---|---|---|---|
| r10 82.422 | | | |
| | d10 1.888 | N6 1.61762 ν6 | 52.70 |
| r11 −101.898 | | | |
| | d11 0.150 | | |
| r12 41.437 | | | |
| | d12 2.162 | N7 1.61762 ν7 | 52.70 |
| r13 1153.747 | | | |
| | d13 0.642 | | |
| r14 −123.026 | | | |
| | d14 4.036 | N8 1.80518 ν8 | 25.43 |
| r15 41.513 | | | |
| | d15 5.056 | | |
| r16 108.871 | | | |
| | d16 2.198 | N9 1.62588 ν9 | 35.70 |
| r17 −58.090 | | | |
| | d17 29.734~ 16.148~ 3.10 | | |
| r18 −95.262 | | | |
| | d18 3.000 | N10 1.64769 ν10 | 31.23 |
| r19 −29.916 | | | |
| | d19 1.767 | | |
| r20 −27.900 | | | |
| | d20 1.800 | N11 1.74250 ν11 | 52.51 |
| r21 128.009 | | | |
| Σd = 91.519~97.527~102.897 | | | |

TABLE 10

Embodiment 9
$f = 102.0 \sim 150.0 \sim 195.0$  $F_{NO} = 5.6$

| radius of curvature | axial distance | refractive index (Nd) | Abbe number (νd) |
|---|---|---|---|
| r1 71.084 | | | |
| | d1 2.000 | N1 1.84666 ν1 | 23.88 |
| r2 50.748 | | | |
| | d2 1.000 | | |
| r3 48.988 | | | |
| | d3 5.000 | N2 1.61800 ν2 | 63.45 |
| r4 390.051 | | | |
| | d4 0.200 | | |
| r5 54.975 | | | |
| | d5 2.500 | N3 1.61800 ν3 | 63.45 |
| r6 66.122 | | | |
| | d6 3.000~ 25.471~ 46.424 | | |
| r7 −56.735 | | | |
| | d7 1.500 | N4 1.60311 ν4 | 60.74 |
| r8 77.784 | | | |
| | d8 0.641 | | |
| r9 67.223 | | | |
| | d9 2.000 | N5 1.80518 ν5 | 25.43 |
| r10 149.121 | | | |
| | d10 19.500~ 9.700~ 3.500 | | |
| r11 −494.447 | | | |
| | d11 2.200 | N6 1.62280 ν6 | 56.98 |
| r12 −74.738 | | | |
| | d12 0.150 | | |
| r13 144.947 | | | |
| | d13 4.000 | N7 1.62280 ν7 | 56.98 |
| r14 −31.543 | | | |
| | d14 0.500 | | |
| r15 −30.539 | | | |
| | d15 1.100 | N8 1.80518 ν8 | 25.43 |
| r16 −62.413 | | | |
| | d16 34.929~ 16.590~ 1.000 | | |
| r17 −280.962 | | | |
| | d17 3.104 | N9 1.75690 ν9 | 31.79 |
| r18 −33.877 | | | |

TABLE 10-continued

Embodiment 9
$f = 102.0 \sim 150.0 \sim 195.0$  $F_{NO} = 5.6$

| radius of curvature | axial distance | refractive index (Nd) | Abbe number (νd) |
|---|---|---|---|
| | d18 0.654 | | |
| r19 −31.193 | | | |
| | d19 1.800 | N10 1.77250 ν10 | 49.77 |
| r20 82.513 | | | |
| Σd = 85.778~80.110~79.273 | | | |

TABLE 11

Embodiment 10
$f = 76.5 \sim 100.0 \sim 147.0$  $F_{NO} = 4.6$

| radius of curvature | axial distance | refractive index (Nd) | Abbe number (νd) |
|---|---|---|---|
| r1 62.637 | | | |
| | d1 1.800 | N1 1.80518 ν1 | 25.43 |
| r2 40.681 | | | |
| | d2 1.000 | | |
| r3 41.478 | | | |
| | d3 4.500 | N2 1.70800 ν2 | 53.23 |
| r4 795.633 | | | |
| | d4 4.300~ 18.653~ 41.603 | | |
| r5 −33.537 | | | |
| | d5 1.400 | N3 1.74400 ν3 | 44.93 |
| r6 62.111 | | | |
| | d6 1.600 | | |
| r7 −87.760 | | | |
| | d7 1.433 | N4 1.52310 ν4 | 50.95 |
| r8 106.641 | | | |
| | d8 0.250 | | |
| r9 67.531 | | | |
| | d9 3.500 | N5 1.80750 ν5 | 35.45 |
| r10 −43.111 | | | |
| | d10 19.095~ 12.748~ 2.500 | | |
| r11 −159.355 | | | |
| | d11 2.500 | N6 1.51728 ν6 | 69.43 |
| r12 −44.769 | | | |
| | d12 0.120 | | |
| r13 71.133 | | | |
| | d13 4.800 | N7 1.51728 ν7 | 69.43 |
| r14 −29.534 | | | |
| | d14 0.600 | | |
| r15 −28.334 | | | |
| | d15 1.500 | N8 1.84666 ν8 | 23.88 |
| r16 −47.815 | | | |
| | d16 22.207~ 14.202~ 1.500 | | |
| r17 −190.503 | | | |
| | d17 3.300 | N9 1.67339 ν9 | 29.25 |
| r18 −45.430 | | | |
| | d18 1.800 | N10 1.67000 ν10 | 57.07 |
| r19 51.455 | | | |
| Σd = 75.706~75.706~75.706 | | | |

TABLE 12

Embodiment 11
$f = 76.5 \sim 100.0 \sim 147.0$  $F_{NO} = 4.6$

| radius of curvature | axial distance | refractive index (Nd) | Abbe number (νd) |
|---|---|---|---|
| r1 60.307 | | | |
| | d1 1.800 | N1 1.80518 ν1 | 25.43 |
| r2 40.244 | | | |
| | d2 1.000 | | |
| r3 42.411 | | | |
| | d3 4.500 | N2 1.69680 ν2 | 56.47 |
| r4 1330.051 | | | |
| | d4 4.300~ | | |

TABLE 12-continued

Embodiment 11
f = 76.5 ~ 100.0 ~ 147.0    FNO = 4.6

| radius of curvature | axial distance | refractive index (Nd) | Abbe number (νd) |
|---|---|---|---|
| | 17.340 ~ 39.106 | | |
| r5  −39.290 | | | |
| | d5  1.400 | N3  1.61800  ν3 | 63.45 |
| r6  107.215 | | | |
| | d6  1.061 | | |
| r7  −1030.577 | | | |
| | d7  2.500 | N4  1.80518  ν4 | 25.43 |
| r8  −98.485 | | | |
| | d8  19.772 ~ 13.250 ~ 2.500 | | |
| r9  −159.213 | | | |
| | d9  2.500 | N5  1.61800  ν5 | 63.45 |
| r10  −44.606 | | | |
| | d10  0.120 | | |
| r11  75.214 | | | |
| | d11  4.300 | N6  1.62041  ν6 | 60.29 |
| r12  −28.810 | | | |
| | d12  0.700 | | |
| r13  −27.028 | | | |
| | d13  1.200 | N7  1.84666  ν7 | 23.88 |
| r14  −52.076 | | | |
| | d14  19.034 ~ 12.517 ~ 1.500 | | |
| r15  −139.636 | | | |
| | d15  3.300 | N8  1.80518  ν8 | 25.43 |
| r16  −31.626 | | | |
| | d16  1.800 | N9  1.66892  ν9 | 45.01 |
| r17  39.183 | | | |
| Σd = 69.287 ~ 69.287 ~ 69.287 | | | |

TABLE 13

Embodiment 12
f = 76.5 ~ 100.0 ~ 147.0    FNO = 4.6

| radius of curvature | axial distance | refractive index (Nd) | Abbe number (νd) |
|---|---|---|---|
| r1  43.030 | | | |
| | d1  1.800 | N1  1.80518  ν1 | 25.43 |
| r2  31.921 | | | |
| | d2  1.000 | | |
| r3  33.537 | | | |
| | d3  5.000 | N2  1.62135  ν2 | 61.28 |
| r4  2340.933 | | | |
| | d4  4.300 ~ 16.056 ~ 34.537 | | |
| r5  −32.669 | | | |
| | d5  1.400 | N3  1.78850  ν3 | 45.68 |
| r6  36.653 | | | |
| | d6  1.850 | | |
| r7  −102.068 | | | |
| | d7  1.688 | N4  1.57135  ν4 | 52.85 |
| r8  239.542 | | | |
| | d8  0.250 | | |
| r9  51.614 | | | |
| | d9  3.500 | N5  1.80750  ν5 | 35.45 |
| r10  −42.375 | | | |
| | d10  15.122 ~ 9.898 ~ 2.500 | | |
| r11  −174.687 | | | |
| | d11  2.500 | N6  1.49520  ν6 | 79.74 |
| r12  −36.470 | | | |
| | d12  0.120 | | |
| r13  73.080 | | | |
| | d13  4.800 | N7  1.49520  ν7 | 79.74 |
| r14  −24.742 | | | |
| | d14  0.600 | | |
| r15  −23.620 | | | |
| | d15  1.500 | N8  1.84666  ν8 | 23.83 |
| r16  −39.051 | | | |

TABLE 13-continued

Embodiment 12
f = 76.5 ~ 100.0 ~ 147.0    FNO = 4.6

| radius of curvature | axial distance | refractive index (Nd) | Abbe number (νd) |
|---|---|---|---|
| | d16  19.115 ~ 12.583 ~ 1.500 | | |
| r17  −96.641 | | | |
| | d17  3.300 | N9  1.67339  ν9 | 20.25 |
| r18  −27.905 | | | |
| | d18  1.800 | N10  1.65160  ν10 | 58.60 |
| r19  41.773 | | | |
| Σd = 69.645 ~ 69.645 ~ 69.645 | | | |

TABLE 14

Embodiment 13
f = 76.5 ~ 100.0 ~ 147.0    FNO = 4.6

| radius of curvature | axial distance | refractive index (Nd) | Abbe number (νd) |
|---|---|---|---|
| r1  67.502 | | | |
| | d1  1.800 | N1  1.80518  ν1 | 25.43 |
| r2  41.451 | | | |
| | d2  1.000 | | |
| r3  41.809 | | | |
| | d3  4.500 | N2  1.67830  ν2 | 48.97 |
| r4  1721.169 | | | |
| | d4  4.300 ~ 20.373 ~ 45.789 | | |
| r5  −29.820 | | | |
| | d5  1.400 | N3  1.68900  ν3 | 49.43 |
| r6  68.435 | | | |
| | d6  1.880 | | |
| r7  −53.694 | | | |
| | d7  1.544 | N4  1.52310  ν4 | 50.95 |
| r8  303.103 | | | |
| | d8  0.250 | | |
| r9  99.882 | | | |
| | d9  3.500 | N5  1.80700  ν5 | 39.71 |
| r10  −35.187 | | | |
| | d10  20.406 ~ 13.716 ~ 2.500 | | |
| r11  −409.073 | | | |
| | d11  2.500 | N6  1.49520  ν6 | 79.74 |
| r12  −53.690 | | | |
| | d12  0.120 | | |
| r13  83.235 | | | |
| | d13  4.800 | N7  1.51728  ν7 | 69.43 |
| r14  −32.629 | | | |
| | d14  0.600 | | |
| r15  −31.839 | | | |
| | d15  1.500 | N8  1.84666  ν8 | 23.83 |
| r16  −54.717 | | | |
| | d16  25.083 ~ 15.700 ~ 1.500 | | |
| r17  −282.303 | | | |
| | d17  3.300 | N9  1.67339  ν9 | 29.25 |
| r18  −47.153 | | | |
| | d18  1.800 | N10  1.67790  ν10 | 53.38 |
| r19  58.792 | | | |
| Σd = 80.283 ~ 80.283 ~ 80.283 | | | |

TABLE 15

Embodiment 14
f = 51.5 ~ 70.0 ~ 97.5    FNO = 4.6

| radius of curvature | axial distance | refractive index (Nd) | Abbe number (νd) |
|---|---|---|---|
| r1  42.564 | | | |
| | d1  1.200 | N1  1.84666  ν1 | 23.88 |
| r2  31.119 | | | |
| | d2  1.000 | | |

TABLE 15-continued

Embodiment 14
f = 51.5~70.0~97.5  FNO 4.6

| radius of curvature | axial distance | refractive index (Nd) | Abbe number (νd) |
|---|---|---|---|
| r3   31.014 | | | |
| | d3  4.300 | N2  1.61800  ν2 | 63.45 |
| r4  −3791.468 | | | |
| | d4  3.500~12.757~25.974 | | |
| r5  −36.614 | | | |
| | d5  1.000 | N3  1.62280  ν3 | 56.98 |
| r6  110.197 | | | |
| | d6  1.200 | | |
| r7  −37.774 | | | |
| | d7  1.000 | N4  1.62280  ν4 | 56.98 |
| r8  28.598 | | | |
| | d8  0.200 | | |
| r9  29.062 | | | |
| | d9  1.800 | N5  1.80518  ν5 | 25.43 |
| r10  103.550 | | | |
| | d10  9.500~5.500~2.500 | | |
| r11  901.745 | | | |
| | d11  2.200 | N6  1.61800  ν6 | 63.45 |
| r12  −33.503 | | | |
| | d12  0.100 | | |
| r13  52.120 | | | |
| | d13  4.500 | N7  1.61800  ν7 | 63.45 |
| r14  −22.966 | | | |
| | d14  0.500 | | |
| r15  −20.938 | | | |
| | d15  1.200 | N8  1.84666  ν8 | 23.88 |
| r16  −36.152 | | | |
| | d16  16.423~13.278~1.500 | | |
| r17  52.308 | | | |
| | d17  2.000 | N9  1.49520  ν9 | 79.74 |
| r18  26.118 | | | |
| Σd = 51.623~53.735~52.174 | | | |

TABLE 16

Embodiment 15
f = 51.5~70.0~97.5  FNO = 4.6~5.7

| radius of curvature | axial distance | refractive index (Nd) | Abbe number (νd) |
|---|---|---|---|
| r1  38.893 | | | |
| | d1  1.200 | N1  1.84666  ν1 | 23.88 |
| r2  28.511 | | | |
| | d2  1.000 | | |
| r3  28.685 | | | |
| | d3  4.500 | N2  1.61800  ν2 | 63.45 |
| r4  −5566.066 | | | |
| | d4  3.000~12.500~24.456 | | |
| r5  −29.247 | | | |
| | d5  1.000 | N3  1.69680  ν3 | 56.47 |
| r6  57.395 | | | |
| | d6  0.800 | | |
| r7  −99.732 | | | |
| | d7  1.022 | N4  1.69680  ν4 | 56.47 |
| r8  38.949 | | | |
| | d8  0.200 | | |
| r9  33.188 | | | |
| | d9  2.200 | N5  1.80518  ν5 | 25.43 |
| r10  165.045 | | | |
| | d10  9.500~5.800~2.500 | | |
| r11  −544.093 | | | |
| | d11  2.500 | N6  1.60311  ν6 | 60.74 |
| r12  −30.050 | | | |
| | d12  0.100 | | |
| r13  44.169 | | | |

TABLE 16-continued

Embodiment 15
f = 51.5~70.0~97.5  FNO 4.6~5.7

| radius of curvature | axial distance | refractive index (Nd) | Abbe number (νd) |
|---|---|---|---|
| | d13  4.000 | N7  1.62280  ν7 | 56.98 |
| r14  −20.784 | | | |
| | d14  0.500 | | |
| r15  −19.569 | | | |
| | d15  1.000 | N8  1.80518  ν8 | 25.43 |
| r16  −42.077 | | | |
| | d16  15.391~11.334~1.500 | | |
| r17  76.197 | | | |
| | d17  2.000 | N9  1.49520  ν9 | 79.74 |
| r18  27.219 | | | |
| Σd = 49.913~51.657~50.478 | | | |

TABLE 17

Embodiment 16
f = 51.5~70.0~97.5  FNO = 4.6

| radius of curvature | axial distance | refractive index (Nd) | Abbe number (νd) |
|---|---|---|---|
| r1  37.368 | | | |
| | d1  1.200 | N1  1.84666  ν1 | 23.88 |
| r2  27.753 | | | |
| | d2  1.000 | | |
| r3  27.880 | | | |
| | d3  4.300 | N2  1.61800  ν2 | 63.45 |
| r4  976.581 | | | |
| | d4  3.500~13.333~25.852 | | |
| r5  −26.558 | | | |
| | d5  1.000 | N3  1.74400  ν3 | 44.93 |
| r6  40.048 | | | |
| | d6  1.300 | | |
| r7  −41.753 | | | |
| | d7  1.118 | N4  1.66892  ν4 | 45.01 |
| r8  55.677 | | | |
| | d8  0.200 | | |
| r9  43.599 | | | |
| | d9  2.000 | N5  1.80518  ν5 | 25.43 |
| r10  −49.149 | | | |
| | d10  9.500~5.600~2.500 | | |
| r11  −4144.386 | | | |
| | d11  2.200 | N6  1.61800  ν6 | 63.45 |
| r12  −31.332 | | | |
| | d12  0.100 | | |
| r13  45.732 | | | |
| | d13  4.500 | N7  1.61800  ν7 | 63.45 |
| r14  −20.823 | | | |
| | d14  0.500 | | |
| r15  −19.513 | | | |
| | d15  1.200 | N8  1.84666  ν8 | 23.88 |
| r16  −38.552 | | | |
| | d16  12.250~8.671~1.500 | | |
| r17  187.848 | | | |
| | d17  2.200 | N9  1.61293  ν9 | 37.01 |
| r18  −111.081 | | | |
| | d18  1.200 | N10  1.62041  ν10 | 60.29 |
| r19  29.773 | | | |
| Σd = 49.269~51.622~53.870 | | | |

TABLE 18

Embodiment 17
f = 51.5 ~ 70.0 ~ 97.5    $F_{NO}$   4.6

| | radius of curvature | | axial distance | | refractive index (Nd) | | Abbe number (νd) |
|---|---|---|---|---|---|---|---|
| r1 | 54.334 | | | | | | |
| | | d1 | 1.200 | N1 | 1.80518 | ν1 | 25.43 |
| r2 | 36.634 | | | | | | |
| | | d2 | 1.000 | | | | |
| r3 | 35.196 | | | | | | |
| | | d3 | 4.300 | N2 | 1.61800 | ν2 | 63.45 |
| r4 | 1061.153 | | | | | | |
| | | d4 | 3.500 ~ 14.200 ~ 28.500 | | | | |
| r5 | −46.055 | | | | | | |
| | | d5 | 1.000 | N3 | 1.61800 | ν3 | 63.45 |
| r6 | −271.248 | | | | | | |
| | | d6 | 1.200 | | | | |
| r7 | −36.145 | | | | | | |
| | | d7 | 1.000 | N4 | 1.51680 | ν4 | 64.12 |
| r8 | 27.752 | | | | | | |
| | | d8 | 0.200 | | | | |
| r9 | 26.857 | | | | | | |
| | | d9 | 1.800 | N5 | 1.80518 | ν5 | 25.43 |
| r10 | 47.237 | | | | | | |
| | | d10 | 12.744 ~ 7.420 ~ 2.500 | | | | |
| r11 | 442.691 | | | | | | |
| | | d11 | 2.500 | N6 | 1.67000 | ν6 | 57.07 |
| r12 | −43.827 | | | | | | |
| | | d12 | 0.100 | | | | |
| r13 | 40.728 | | | | | | |
| | | d13 | 5.000 | N7 | 1.62135 | ν7 | 61.28 |
| r14 | −26.438 | | | | | | |
| | | d14 | 1.000 | | | | |
| r15 | −23.808 | | | | | | |
| | | d15 | 1.200 | N8 | 1.80518 | ν8 | 25.43 |
| r16 | −56.837 | | | | | | |
| | | d16 | 13.699 ~ 9.532 ~ 1.500 | | | | |
| r17 | 40.541 | | | | | | |
| | | d17 | 2.000 | N9 | 1.49520 | ν9 | 79.74 |
| r18 | 23.188 | | | | | | |

Σd = 53.443 ~ 54.652 ~ 56.000

What is claimed is:

1. An ultra compact zoom lens system, comprising from object side to image side:
   a first lens unit of a positive refractive power;
   a second lens unit of a negative refractive power with a first variable air space formed between the first and second lens units;
   a third lens unit of a positive refractive power; and
   a fourth lens unit of a negative refractive power with a second variable air space formed between the third and fourth lens units;
   wherein the first lens unit is shiftable from the image side to the object side while increasing the first variable air space in the zooming operation from the shortest focal length to the longest focal length; and
   wherein the fourth lens unit is shiftable from the image side to the object side while decreasing the second variable air space in the zooming operation from the shortest focal length to the longest focal length.

2. An ultra compact zoom lens system as claimed in claim 1, wherein the lens system fulfills the following condition:

$$-0.5 < \alpha + \gamma < 2.0$$

provided that $$\alpha + \gamma = -\left(1 + \frac{\phi_2 + \phi_3 + \phi_4}{\phi_1}\right)$$

wherein, $\phi_1$, $\phi_2$, $\phi_3$, and $\phi_4$ represent the refractive powers of the first to fourth lens units, respectively, when the shortest focal length of the whole lens system is normalized to 1, $f_1$ represents the focal length of the first lens unit when the shortest focal length of the whole lens system is normalized to 1, Z represents the zoom ratio of the whole lens system, b represents the back focal length of the whole lens system for the shortest focal length when the shortest focal length of the whole lens system is normalized to 1.

3. An ultra compact zoom lens system as claimed in claim 1, wherein the zoom lens system fulfills the following condition:

$$-0.7 \frac{f_1}{Z} < \alpha + \gamma < 0.9 \frac{Z - f_1 - b}{b}$$

$$\alpha + \gamma = -\left(1 + \frac{\phi_2 + \phi_3 + \phi_4}{\phi_1}\right)$$

wherein, $\phi_1$, $\phi_2$, $\phi_3$, and $\phi_4$ represent the refractive powers of the first to fourth lens units, respectively, when the shortest focal length of the whole lens system is normalized to 1, $f_1$ represents the focal length of the first lens unit when the shortest focal length of the whole lens system is normalized to 1, Z represents the zoom ratio of the whole lens system, b represents the back focal length of the whole lens system for the shortest focal length when the shortest focal length of the whole lens system is normalized.

4. An ultra compact zoom lens system as claimed in claim 3, wherein the lens system further fulfills the following conditions:

$$-0.5 < \alpha 21 \cdot 1.5$$

$$-1.5 < \gamma < 0.5$$

wherein, $\alpha$ represents $-(1 + \phi_2/\phi_1)$, and $\gamma$ represents $-(\phi_3\phi_4)/\phi_1$.

5. An ultra compact zoom lens system as claimed in claim 3, wherein the lens system further fulfills the following conditions:

$$1 < \alpha < 3$$

$$-3 < \gamma < 1$$

wherein, $\alpha$ represents $-(1 + \phi_2/\phi_1)$, and $\gamma$ represents $-\phi_3 + \phi_4/\phi_4$.

6. An ultra compact zoom lens system as claimed in claim 3, wherein the lens system further fulfills the following conditions:

$$-0.5 \frac{Z(1-b)}{f_1} < \alpha < 1.5$$

$$-1.5 < \gamma < 0.5 \frac{Z(1-b)}{f_1}$$

wherein, $\alpha$ represents $-(1+\phi_2/\phi_1)$, and $\gamma$ represents $-(100_3+\phi_4)/\phi_1$.

7. An ultra compact zoom lens system as claimed in claim 6, wherein the lens system further fulfills the following conditions:

$0 < 1/\beta_{2L} < 1$ $0 < \beta_{3L} < 1$ $0 < 1/\beta_{4L} < L$ wherein, $\beta_{2L}$, $\beta_{3L}$ and $\beta_{4L}$ represent lateral magnification of the second, third and fourth lens units respectively for the longest focal length.

8. An ultra compact zoom lens system as claimed in claim 7, wherein the lens system further fulfills the following condition:

$0.2 < f_{S123}/|f_4| < 2.0$ wherein, $f_{S123}$ represents the compound focal length of the first to third lens units for the shortest focal length, and $f_4$ represents the focal length of the fourth lens unit.

9. An ultra compact zoom lens system as claimed in claim 8, wherein the lens system further fulfills the following conditions:

$1.15 < \beta_{4L}/\beta_{4S} < 2.0$ $0.1 < \Delta d_{34}/f_S < 1.0$ wherein, $B_{4S}$ represents the lateral magnification of the fourth lens unit for the shortest focal length, $\Delta d_{34}$ represents the decreasing axial amount of the second variable air space in the zooming operation from the shortest focal length to the longest focal length, and $f_S$ represents the focal length of the whole lens system.

10. An ultra compact zoom lens system as claimed in claim 9, wherein the third lens unit is fixed along the optical axis in the zooming operation.

11. An ultra compact zoom lens system as claimed in claim 9, wherein the second lens unit is fixed along the optical axis in the zooming operation.

12. An ultra compact zoom lens system as claimed in claim 9, wherein the fourth lens unit is shifted integrally with the first lens unit in the zooming operation.

13. An ultra compact zoom lens system comprising the following design parameters;

| | | | | | | |
|---|---|---|---|---|---|---|
| f = 102.5~140.0~195.0 | | | | F.NO. = 4.5 | | |
| | radius of curvature | | axial distance | | refractive index (Nd) | Abbe number ($\nu d$) |
| r1 | 62.096 | | | | | |
| | | d1 | 2.200 | N1 | 1.80518 $\nu 1$ | 25.43 |
| r2 | 44.325 | | | | | |
| | | d2 | 1.300 | | | |
| r3 | 46.360 | | | | | |
| | | d3 | 6.100 | N2 | 1.62041 $\nu 2$ | 60.29 |
| r4 | 798.824 | | | | | |
| | | d4 | 3.500~32.040~65.701 | | | |
| r5 | −85.141 | | | | | |
| | | d5 | 1.500 | N3 | 1.71300 $\nu 3$ | 53.93 |
| r6 | 88.239 | | | | | |
| | | d6 | 2.000 | N4 | 1.80518 $\nu 4$ | 25.43 |
| r7 | 617.791 | | | | | |
| | | d7 | 38.069~21.304~5.000 | | | |
| r8 | 55.510 | | | | | |
| | | d8 | 1.600 | N5 | 1.84666 $\nu 5$ | 23.83 |
| r9 | 28.939 | | | | | |
| | | d9 | 1.100 | | | |
| r10 | 32.136 | | | | | |
| | | d10 | 4.500 | N6 | 1.72000 $\nu 6$ | 52.14 |
| r11 | −82.898 | | | | | |
| | | d11 | 31.132~19.357~2.000 | | | |
| r12 | 220.759 | | | | | |
| | | d12 | 4.000 | N7 | 1.67339 $\nu 7$ | 29.25 |
| r13 | −30.975 | | | | | |
| | | d13 | 1.500 | N8 | 1.74400 $\nu 8$ | 44.93 |
| r14 | 41.862 | | | | | |

\* \* \* \* \*